US008483496B2

(12) United States Patent
Boon et al.

(10) Patent No.: US 8,483,496 B2
(45) Date of Patent: Jul. 9, 2013

(54) IMAGE ENCODING/DECODING SYSTEM

(75) Inventors: Choong Seng Boon, Yokohama (JP); Yoshinori Suzuki, Saitama (JP); Thiow Keng Tan, Jalan Sindor (SG)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/188,342

(22) Filed: Jul. 21, 2011

(65) Prior Publication Data
US 2011/0286679 A1    Nov. 24, 2011

Related U.S. Application Data

(63) Continuation of application No. PCT/JP2009/071634, filed on Dec. 25, 2009.

(30) Foreign Application Priority Data

Jan. 22, 2009   (JP) ................................ 2009-012299

(51) Int. Cl.
*G06K 9/36*    (2006.01)
*G06K 9/46*    (2006.01)

(52) U.S. Cl.
USPC .......................................... 382/238; 382/190

(58) Field of Classification Search
USPC .............. 382/100, 209, 232, 236, 238, 298, 382/173; 375/240.24, 240.14, 240.16; 386/224; 705/14.58; 709/203; 345/522, 156; 348/222.1, 348/394.1, 409.1–419.1; 358/426.02–426.11; 380/201
See application file for complete search history.

(56) References Cited

U.S. PATENT DOCUMENTS

| 5,974,184 | A  | * | 10/1999 | Eifrig et al. .................. 382/236 |
| 6,765,964 | B1 |   | 7/2004  | Conklin .................. 375/240.14 |
| 6,859,559 | B2 | * | 2/2005  | Boon et al. .................... 382/238 |
| 2003/0059120 | A1 | * | 3/2003 | Boon et al. .................... 382/238 |
| 2006/0193388 | A1 | * | 8/2006 | Woods et al. ............ 375/240.16 |
| 2007/0121731 | A1 | * | 5/2007 | Tanizawa et al. ........ 375/240.24 |
| 2010/0103476 | A1 | * | 4/2010 | Yashiro ........................ 358/464 |
| 2011/0096837 | A1 | * | 4/2011 | Demos .................... 375/240.15 |
| 2011/0103478 | A1 | * | 5/2011 | Demos .................... 375/240.15 |
| 2011/0122941 | A1 | * | 5/2011 | MacInnis et al. .......... 375/240.2 |

FOREIGN PATENT DOCUMENTS

| WO | WO 97/46021      | 12/1997 |
| WO | WO 2007/063808 A1 | 6/2007 |
| WO | WO 2010/084692 A1 | 7/2010 |

OTHER PUBLICATIONS

International Search Report issued in PCT Application No. PCT/JP2009/071634, with English translation of cited references page only (10 pgs.).

* cited by examiner

*Primary Examiner* — Hadi Akhavannik
*Assistant Examiner* — Mehdi Rashidian
(74) *Attorney, Agent, or Firm* — Brinks Hofer Gilson & Lione

(57) ABSTRACT

A picture prediction encoding device includes: a region division unit for dividing an input picture into a plurality of blocks; a prediction signal generation unit for generating a prediction signal with respect to a pixel signal that is included in a subject block to be processed among the blocks; a residual signal generation unit for generating a residual signal between the pixel signal of the subject block and the generated prediction signal; a signal encoding unit for generating a compressed signal by encoding the residual signal; and a storage unit for decompressing the compressed signal and storing the decompressed signal as a reproduced pixel signal. The prediction signal generation unit is configured to subdivide the subject block into a plurality of small regions, at least one of the small regions is non-square, and a length of a first side of the non-square small region is longer than a length of a second side that is different from the first side.

7 Claims, 16 Drawing Sheets

*Fig.13*

| MODE | DIVISION METHOD |
|---|---|
| 2,3,4 | FIG. 6(A) |
| 0,5,7 | FIG. 6(C) |
| 1,6,8 | FIG. 6(E) |

IMAGE ENCODING/DECODING SYSTEM

This application is a continuation of PCT/JP2009/071634, filed Dec. 25, 2009, which claims the benefit of the filing date under 35 U.S.C. §119(e) of JP2009-012299, filed Jan. 22, 2009, both of which are incorporated herein by reference.

TECHNICAL FIELD

The present invention relates to a picture prediction encoding device, method and program, a picture prediction decoding device, method and program, and an encoding/decoding system and method, and more particularly to image prediction encoding/decoding accompanied by intra prediction.

BACKGROUND ART

In order to efficiently perform transmission and accumulation of still picture data or moving picture data, compression encoding technology is used. In the case of moving pictures, methods such as MPEG1 to 4 or H.261 to H.264 have been widely used. These encoding methods perform an encoding/decoding process after dividing a picture to be encoded into a plurality of blocks.

SUMMARY OF INVENTION

The image encoding/decoding system includes an image encoding device and an image decoding device. An embodiment of the image prediction encoding device, or picture prediction encoding device, may include: a region division unit for dividing an input picture into a plurality of blocks; and a prediction signal generation unit for generating a prediction signal with respect to a pixel signal that is included in a subject block to be processed among the plurality of blocks. The image encoding device may also include: a residual signal generation unit for generating a residual signal between the pixel signal of the subject block and the generated prediction signal; a signal encoding unit for generating a compressed signal by encoding the residual signal; and a storage unit for decompressing the compressed signal and storing the decompressed signal as a reproduced pixel signal. The prediction signal generation unit may be configured to re-divide, or sub-divide each of the subject blocks into a plurality of small regions or sub regions. At least one of the small regions may be other than a square region. For example, a length of a first side of the non-square small region may be longer than a length of a second side of the non-square region. The second side of the non-square region may be different from the first side of the non-square region, such as being disposed along a different boundary of the non-square region. In one example, the residual signal may be generated for the non-square region, and the pixel signal may be included in the non-square region.

In an embodiment of the picture prediction encoding device, the prediction signal generation unit may, for example, generate a prediction signal of the non-square small region using an already reproduced pixel signal that comes in contact, or is contiguous with the first side. In another example, the first side of the non-square small region may come in contact with the already reproduced pixel, the second side may not come in contact with the already reproduced pixel, and the prediction signal generation unit may be configured to generate the prediction signal of the non-square small region using the already reproduced pixel signal that comes in contact with the first side.

In addition, the signal encoding unit may be configured to encode prediction signal generation related information indicating a method of generating the prediction signal of the small region. The method of generating the prediction signal may be one of a plurality of available prediction procedures. The prediction procedure chosen may be a result of minimization of error between the actual and the predicted pixel signal included in the small region. The signal encoding unit may generate and output an output signal that includes the prediction procedure obtained through the encoding process, together with, as part of, or in addition to the compressed signal.

An embodiment of the image prediction decoding device, or picture prediction decoding device, includes: an input unit for dividing a picture into a plurality of blocks, and further dividing at least one of the blocks into a plurality of small regions. At least one of the small regions may be other than square. A length of a first side of the non-square small region may be different than a length of a second side of the non-square small region, such as being longer. In addition, the second side may be different from the first side, such as being disposed along a different boundary of the non-square region. The input unit may also be configured to input compressed picture data that includes a residual signal generated by prediction-encoding a pixel signal included in the small region, and prediction signal generation related information. The prediction signal generation related information may be a prediction procedure indicating a method of generating a prediction signal of the small region in the prediction encoding. The picture prediction decoding device may also include a decompression unit for extracting the residual signal of the small region from the compressed picture data and decompressing a reproduced residual signal. In addition, the picture prediction decoding device may include a prediction signal generation unit for extracting the prediction signal generation related information from the compressed picture data, and generating the prediction signal of the small region in accordance with the prediction signal generation related information. A picture decompression unit for decompressing the pixel signal of the small region by adding the reproduced residual signal to the prediction signal of the small region; and a storage unit for storing the decompressed pixel signal as a reproduced pixel signal may also be included in the picture prediction decoding device. The prediction signal generation unit may be configured to generate the prediction signal of the non-square small region using, for example, an already reproduced pixel signal that comes in contact with, or is contiguous with the first side of the non-square small region.

In one example, the first side of the non-square small region may come in contact with the already reproduced pixel, and the second side may not come in contact with the already reproduced pixel.

The prediction signal generation unit included in the picture prediction decoding device may be configured to specify a shape of the small region based on the prediction signal generation related information. The prediction signal generation unit may generate the prediction signal of the small region according to the specified shape of the small region. Generation of the prediction signal of the small region by the prediction signal generation unit may be based on the prediction signal generation related information.

The decompression unit included in the picture prediction decoding device may be configured to decompress the residual signal of the small region to the reproduced residual signal by specifying a shape of the small region. The shape of the small region may be based on the prediction signal generation related information and performing at least one of de-quantization and inverse frequency transform according to the specified shape of the small region.

The image encoding/decoding system may include a picture prediction encoding method and a picture prediction encoding program, that may be described as follows. An embodiment of a picture prediction encoding method executed by a picture prediction encoding device may include the steps of: dividing an input picture into a plurality of blocks; generating a prediction signal with respect to a pixel signal that is included in a subject block to be processed among the plurality of blocks; and generating a residual signal between the pixel signal of the subject block and the generated prediction signal. The picture prediction encoding method may further include generating a compressed signal by encoding the residual signal, decompressing the compressed signal, and storing the decompressed signal as a reproduced pixel signal. In addition, in the step of generating a prediction signal, the subject block may be sub-divided into a plurality of small regions. At least one of the small regions may be other than square, and a length of a first side, or first boundary, of the non-square small region may be different than, such as longer than a length of a second side, or second boundary, of the non-square small region. The second side may be different from the first side, such as being along a different boundary of the non-square region. In one example, the prediction signal may be generated for the non-square small region, and the pixel signal may be included in the small region.

In the step of generating a prediction signal, a prediction signal of the non-square small region may be generated using an already reproduced pixel signal of an already reproduced pixel, such as an already reproduced pixel that comes in contact, or is contiguous with the first side of the non-square small region.

In another example, the first side of the non-square small region may come in contact with the already reproduced pixel, the second side may not come in contact with the already reproduced pixel, and in the step of generating a prediction signal, a prediction signal of the non-square small region may be generated using the already reproduced pixel signal of an already reproduced pixel, such as an already reproduced pixel that comes in contact with the first side.

Also, in the step of generating a compressed signal, prediction signal generation related information indicating a method of generating the prediction signal of the small region may be encoded. A signal obtained through the encoding may be output together with, as part of, or in addition to the compressed signal.

The image encoding/decoding system may also include a picture prediction encoding program stored in a non-transitory computer readable medium. An embodiment of the image encoding/decoding system causes a computer, or processor, to execute instructions included in the computer readable medium. The computer readable medium may include a region division unit executable to divide an input picture into a plurality of blocks; a prediction signal generation unit executable to generate a prediction signal with respect to a pixel signal that is included in a subject block to be processed among the plurality of blocks; and a residual signal generation unit executable to generate a residual signal between the pixel signal of the subject block and the generated prediction signal. The computer readable medium may also include a signal encoding unit executable to generate a compressed signal by encoding the residual signal; and a storage unit executable to decompress the compressed signal and store the decompressed signal as a reproduced pixel signal. The prediction signal generation unit may be further executable to sub-divide the subject block into a plurality of small regions.

At least one of the small regions may be formed by the prediction signal generation unit to be other than square, such that a length of a first side (or first boundary) of the non-square small region is different than a length of a second side (or second boundary) of the non-square small region that is different from the first side. In one example, a first side (or first boundary) of the non-square small region is longer than a length of a second side (or second boundary) of the non-square small region. The prediction signal may be generated by the prediction signal generation unit for the non-square small region, and the pixel signal may be included in the small region.

The image encoding/decoding system also includes a picture prediction decoding method and a picture prediction decoding program, that may be described as follows.

An embodiment of a picture prediction decoding method may include the steps of: dividing a picture into a plurality of blocks with a picture prediction decoding device, and further dividing the block into a plurality of small regions with the picture prediction decoding device. At least one of the small regions may be non-square and a length of a first side of the non-square small region is different than a length of a second side of the non-square small region. The second side of the non-square small region is different from the first side. The method also includes the picture prediction decoding device inputting compressed picture data and prediction signal generation related information in the prediction encoding. The compressed picture data comprising a residual signal generated with the picture prediction decoding device by prediction-encoding a pixel signal included in the small region, and the prediction signal generation related information indicating a method of generating the prediction signal of the small region. The method may also include the picture prediction decoding device extracting the residual signal of the small region from the compressed picture data and decompressing a reproduced residual signal, extracting the prediction signal generation related information from the compressed picture data, and generating the prediction signal of the small region in accordance with the prediction signal generation related information. Decompressing the pixel signal of the small region by adding the reproduced residual signal to the prediction signal of the small region, and storing the decompressed pixel signal as a reproduced pixel signal may also be included in the method. The prediction signal of the non-square small region may be generated using an already reproduced pixel signal that comes in contact, or is contiguous with the first side of the non-square small region.

The first side of the non-square small region may come in contact with, or be contiguous with the already reproduced pixel, and the second side may not come in contact with, or be spaced away from the already reproduced pixel.

The step of generating the prediction signal of the small region, may include specifying a shape of the small region based on the prediction signal generation related information. The prediction signal of the small region may be generated by the picture prediction decoding device according to the specified shape of the small region in accordance with the prediction signal generation related information.

The step of decompressing a reproduced residual signal, may include decompressing the residual signal of the small region to create the reproduced residual signal by specifying a shape of the small region based on the prediction signal generation related information, and performing at least one of de-quantization and inverse frequency transformation according to the specified shape of the small region.

The image encoding/decoding system may also include an embodiment of a picture prediction decoding program stored in a non-transitory computer readable medium. The image encoding/decoding system may cause a computer, or processor, to execute instructions included in the computer readable medium. The computer readable medium includes: an input unit executable to divide a picture into a plurality of blocks, and further divide at least one of the blocks into a plurality of small regions. At least one of the small regions is other than square and a length of a first side, or boundary, of the non-square small region is different than, such as longer than, a length of a second side, or boundary, of the non-square small region. The second side of the non-square region is different from the first side, such as being disposed along a different boundary of the non-square region. The input unit may be further executable to input compressed picture data that includes a residual signal generated by prediction-encoding a pixel signal included in the small region and prediction signal generation related information indicating a method of generating a prediction signal of the small region in the prediction encoding. The computer readable medium may also include a decompression unit executable to extract the residual signal of the small region from the compressed picture data and decompress a reproduced residual signal. The computer readable medium may further include a prediction signal generation unit executable to extract the prediction signal generation related information from the compressed picture data and generate the prediction signal of the small region based on the prediction signal generation related information. A picture decompression unit executable to decompress the pixel signal of the small region by addition of the reproduced residual signal to the prediction signal of the small region may also be included in the computer readable medium. The computer readable medium may further include a storage unit executable to store the decompressed pixel signal as a reproduced pixel signal. The prediction signal generation unit may also be executable to generate the prediction signal of the non-square small region using an already reproduced pixel signal that comes in contact with, or is contiguous with the first side.

The image encoding/decoding system may be configured to include the above-described picture prediction encoding device and the above-described picture prediction decoding device. Alternatively, or in addition, the system may include an encoding/decoding method that is executed by the image encoding/decoding system, which includes steps of the above-described picture prediction encoding method that is executed by the picture prediction encoding device and steps of the above-described picture prediction decoding method that is executed by the picture prediction decoding device.

Since pixels of a small region that is far apart from, or separated away from an already reproduced pixel signal are prevented from occurring, and instead pixels of a small region that is close to the already reproduced pixel signal may be predicted, a prediction signal having higher accuracy can be generated by the image encoding/decoding system, and a prediction residual signal of the small region can be kept low to improve encoding efficiency.

Thus, when a subject block is divided into small regions, a first side (or boundary) of the block that comes in contact with, or is contiguous with an already reproduced pixel may be set to be longer than a second side of the block that does not come in contact with the already reproduced pixel, and a prediction signal of at least one of the small regions may be generated using the already reproduced pixel signal that comes in contact with the first side. Accordingly, a pixel included in the at least one of the small regions is close to the already reproduced pixel signal, and thus a prediction signal with small, or minimized error can be generated for the at least one of the small regions.

Also, since the division shapes of the small areas and the quantization method/frequency transform method of the residual signal of the small region may be determined by prediction signal generation related information that indicates the method, or procedure, of generating the prediction signal, it is unnecessary to send separate indication information for identifying the division shapes of the small areas and the quantization method/frequency transform method from the transmitting side to the receiving side. Instead, at the receiving side, the division shapes of the small areas and the quantization method/frequency transform method are inherently specified by the prediction signal generation related information. Thus, the decoding/reproduction process can be performed with the optimum de-quantization/inverse frequency transform which are substantially equal to those on the transmitting side. As a result, it is unnecessary to add auxiliary information except for the prediction signal generation related information, and thus the code amount can be further suppressed or minimized.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF DRAWINGS

FIG. 13 is a table representing an example of a corresponding relationship between a prediction mode and a method of dividing a subject block.

DESCRIPTION OF EMBODIMENTS

With MPEG4 or H.264, in order to further improve encoding efficiency, regarding an intra prediction encoding, a prediction signal and a residual signal may be generated and encoded. The prediction signal and the residual signal may be generated using an already reproduced picture signal that is obtained by decompressing the compressed picture data. The already reproduced picture signal may be adjacent to a subject block in the same frame. The residual signal may be obtained by subtracting the prediction signal from the picture signal of a subject block. In inter prediction encoding, a prediction signal and a residual signal may be encoded. The prediction signal may be generated by performing motion correction with reference to an already reproduced picture signal that is adjacent to a subject block in a different frame from the subject block. The residual signal may be obtained by subtracting the prediction signal from the picture signal of the subject block.

Specifically, the H.264 intra prediction encoding may adopt a method of generating a prediction signal by extrapolating an already reproduced pixel value that is adjacent to a subject block to be encoded in a predetermined direction.

Figure 15:
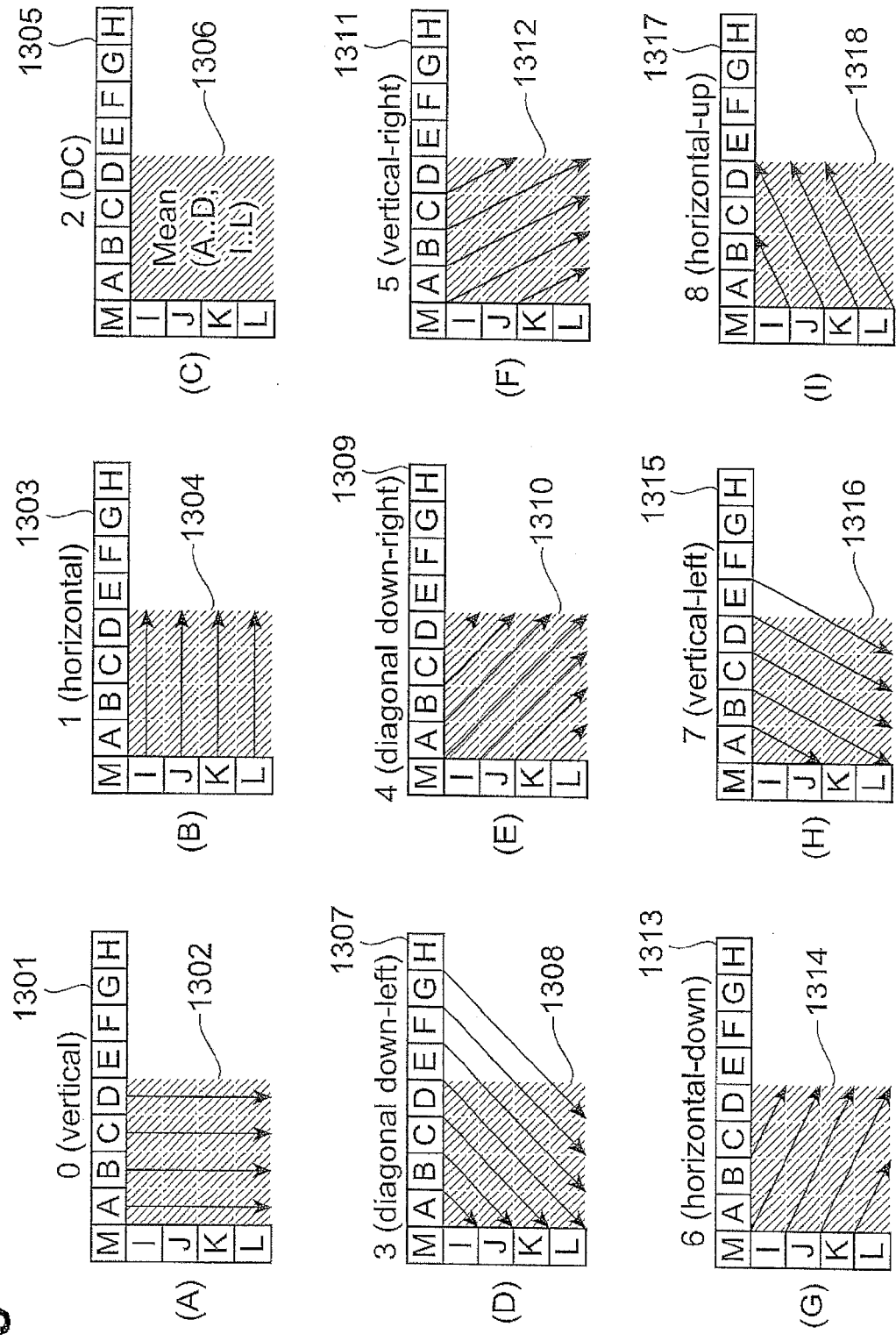
FIG. 15 is a schematic diagram illustrating an example of a method of generating a prediction signal of a subject block.

FIG. 15 is a schematic diagram illustrating an example intra prediction method that may be used in H.264. In FIG. 15(A), a block 1302 represents a subject block, a pixel group which is composed of pixels A to M (adjacent pixels 1301) that are adjacent to, and contiguous with, the boundary of the subject block represents an adjacent region that corresponds to an already reproduced picture signal in a past process. In this case, among the adjacent pixels 1301, the already reproduced pixels A to D that are present just above the subject block 1302 may be extended downward to generate the prediction signal. Also, in FIG. 15(B), among the adjacent pixels 1303, the already reproduced pixels I to L that are present on the left side of the subject block 1304 may be extended to the right to generate the prediction signal. Differences between the pixel signal of the subject block 1302, 1304, 1306, 1308, 1310, 1312, 1314, 1316, 1318, and nine (9) prediction signals generated by the methods using the corresponding adjacent pixels 1301, 1303, 1305, 1307, 1309, 1311, 1313, 1315, 1317 as illustrated in FIGS. 15(A) to 15(I) may be obtained, and the method having the smallest difference value may be determined as the optimum prediction method.

Figure 16:
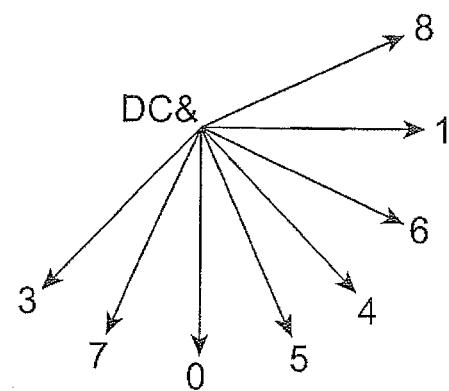
FIG. 16 is a schematic diagram illustrating examples of a plurality of methods for generating a prediction signal of a subject block.

These extrapolating methods can be summarized as illustrated in FIG. 16. Arrows in FIG. 16 indicate directions in which the already reproduced pixels are extended, and the numbers described for the respective directions represent identification numbers (which are also called "prediction modes"). In this case, with respect to the method of generating a prediction signal by means of an average of the adjacent already-reproduced pixels, an identification number "2" is given as illustrated in FIG. 15(C), and this is indicated as "DC" in FIG. 16. That is, FIG. 16 illustrates nine (9) methods in total, which include a method of the identification number "2" that has no direction in which the already reproduced pixels are extended (a method of generating a prediction signal by means of an average of the adjacent already-reproduced pixels) and eight (8) methods that have directions in which the already reproduced pixels are extended as indicated by the arrows.

In intra prediction signal generation, however, square blocks may become the subject of prediction, and thus the prediction accuracy may be degraded with respect to pixels that are far apart from the boundary where the already reproduced pixels exist.

For example, a case where the picture signal is changed little by little in the vertical direction as illustrated in FIG. 15(A) is considered. In this case, with respect to the pixel that is present on the upper side (for example, the pixel that is present on the right side of the adjacent pixel I) of the subject block 1302, an error becomes small even if the pixel approximates the adjacent pixels A to D, whereas with respect to the pixel that is present on the lower side (for example the pixel that is present on the right side of the adjacent pixel L) of the subject block 1302, the pixel is far apart from the adjacent pixels A to D, and thus the error becomes larger if the pixel approximates the adjacent pixels A to D. As a result, the code amount may be increased and thus compression efficiency is degraded. With respect to prediction methods other than the prediction method illustrated in FIG. 15(A), the same tendency is possible.

The image encoding/decoding system described herein improves encoding efficiency by improving prediction accuracy of the pixels that are far apart from the boundary of the subject block as described with reference to FIGS. 1 to 14.

Image Prediction Encoding Device

Figure 1:
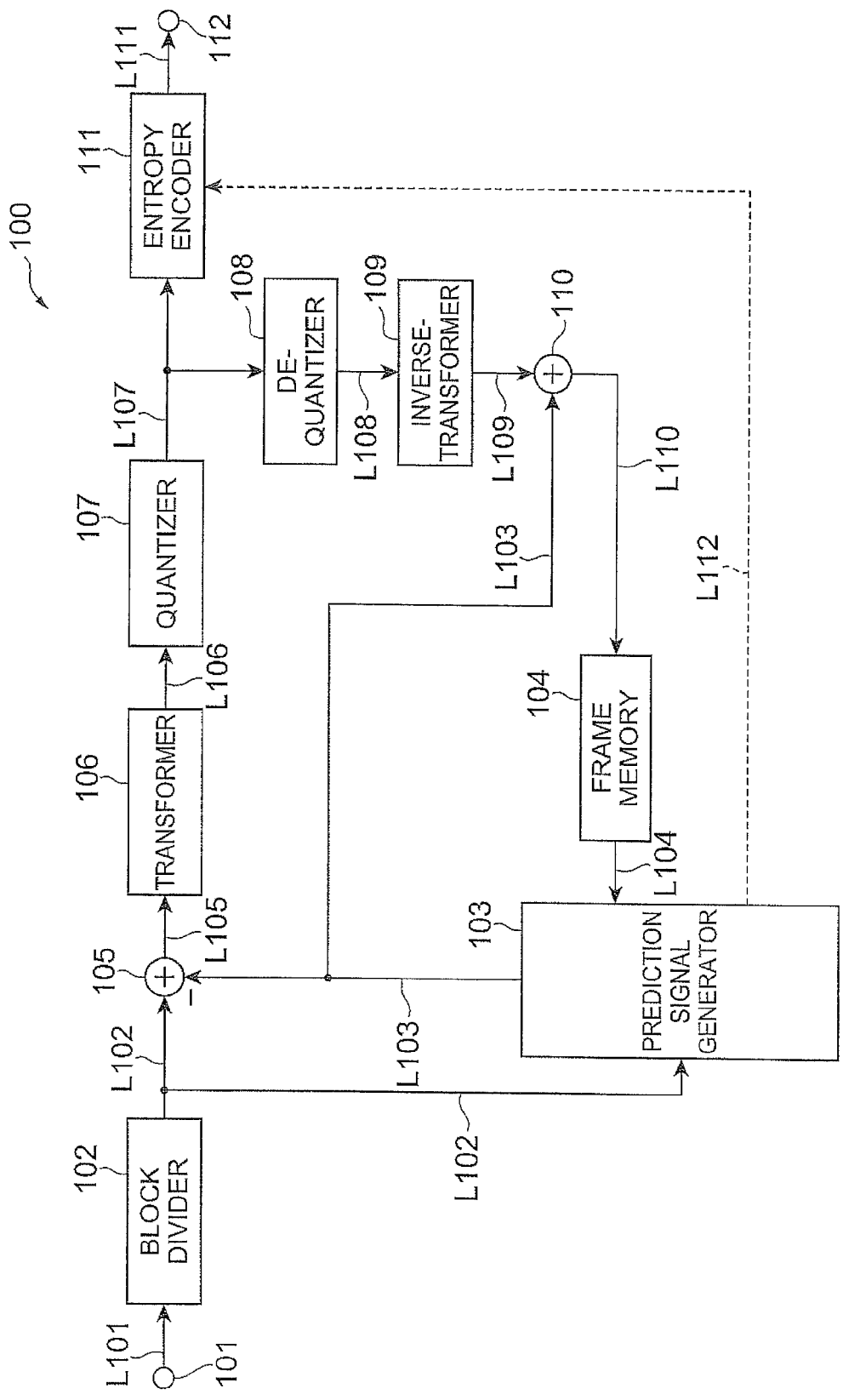
FIG. 1 is a block diagram illustrating an example configuration of a picture prediction encoding device.

FIG. 1 is a block diagram illustrating an example configuration of a picture prediction encoding device 100. The picture predicting encoding device 100 or image prediction encoding device may be a computing device or computer, including for example software, hardware, or a combination of hardware and software, as described later, capable of performing the described functionality. The image prediction encoding device 100 may be one or more separate systems or devices, may be one or more systems or devices included in the image encoding/decoding system, or may be combined with other systems or devices within the image encoding/decoding system. In other examples, fewer or additional blocks may be used to illustrate the functionality of the image prediction encoding device 100. As illustrated in FIG. 1, the picture prediction encoding device 100 may include an input terminal 101, a block divider 102, a prediction signal generator 103, a frame memory 104, a subtractor 105, a transformer 106, a quantizer 107, a de-quantizer 108, an inverse-transformer 109, an adder 110, an entropy encoder 111, and an output terminal 112. The functionality included in the picture prediction encoding device 100 may be modules or units. The term "module" or "unit" may be defined to include one or more executable parts of the image encoding/decoding system. As described herein, the modules and/or units are defined to include software, hardware or some combination thereof executable by a processor (described later). Software included in the modules and/or units may include instructions stored in memory or a computer readable medium that are executable by the processor, or any other processor. Hardware included in the modules and/or units may include various devices, components, circuits, gates, circuit boards, and the like that are executable, directed, and/or controlled for performance by the processor.

Hereinafter, the operation of the example picture prediction encoding device 100 as configured above will be described. A moving picture signal that is composed of plural sheets of a changing picture or a static picture is input to the input terminal 101. The picture in a particular sheet that is to be encoded may be divided into a plurality of regions through the block divider 102. In this embodiment, as an example, the picture is divided into 8×8 pixel blocks. In other examples, the picture may be divided into other block sizes or shapes with fewer or greater numbers of regions. Next, prediction signals may be generated with respect to the regions to be encoded (hereinafter the regions may also be referred to as "subject blocks"). In this embodiment, two prediction methods, that is, "inter prediction" and "intra prediction", may be used.

In the inter prediction method, a reproduced picture which was previously encoded and then decompressed in the past is considered as a reference picture, and motion information that provides a prediction signal having the smallest error with respect to a subject block is obtained from the reference picture. This process is called motion detection. Also, according to circumstances, the subject block may be divided again into smaller regions, or re-divided, by again dividing the previously formed first regions into smaller second regions. Thus, the picture having N×N regions, such as 8×8 regions or pixel blocks may be further divided by dividing each of the first regions into two or more second regions or sub-regions or smaller regions contained within a respective one of the first regions. At least some of the second regions or sub-regions may be a shape other than square, or may be formed to have a non-square shape. The non-square regions may be any shape other than a square, such as a polygon, a quadrilateral, a tetragon, a rhombus, a rectangle, a rhomboid or any other shape formed with four or more interior angles identifying the boundaries of the region, where at least some of the interior angles are oblique angles. In one example, at least some of the non-square small regions may include interior angles, some of which are other than right angles that add up to, or total, 360 degrees. A length of a first side, or first boundary, of a non-square small region may be different, such as longer, than a length of a second side, or second boundary, of the non-square small region. The second side may be different from the first side, such as being along a different boundary, or perimeter of the non-square region.

The inter prediction method may be determined with respect to the re-divided small regions. In this case, among various division methods, a division method having best efficiency and respective motion information is determined with respect to the whole subject block. In an embodiment, the above-described process is performed by the prediction signal generator 103, and the subject block and the reference picture are input to the prediction signal generator 103 through a line L102 and a line L104, respectively. Any of a plurality of pictures which were previously encoded and then decompressed in the past may be used as the reference picture. The motion information and the method of dividing small regions, which may be determined as described above, may be sent to the entropy encoder 111 through a line L112 to be encoded, and then may be output from the output terminal 112. The prediction signal generator 103 may generate the prediction signal by acquiring the reference picture signal from the frame memory 104 based on the method of dividing the small regions, and the motion information that corresponds to the respective small regions. The inter prediction signal generated as described above may be sent to the subtractor 105 through a line L103.

On the other hand, in the intra prediction method, the intra prediction signal may be generated using an already reproduced pixel value that is spatially adjacent to the subject block. Specifically, the prediction signal generator 103 may acquire the already reproduced pixel signal that is present in the same frame from the frame memory 104, determine the intra prediction method that generates the prediction signal with a predetermined method, and generate the intra prediction signal as the prediction signal based on the prediction method. Information regarding the prediction method may be sent to the entropy encoder 111 through the line L112 to be encoded, and then may be output from the output terminal 112. The intra prediction signal generated as above may be sent to the subtractor 105. The details of the intra prediction signal generation in the prediction signal generator 103 will be described later.

Whichever of the inter prediction signals or the intra prediction signals obtained as described above, which has the smallest error, may be selected and sent to the subtractor 105. However, when there is no previously processed picture or image in the past with respect to the first sheet of picture, subject blocks may be processed by intra prediction. In this case, a method of generating an intra prediction signal to be described hereinafter may be applied to the encoding/decoding of a still picture or image, such as a photograph or the like.

The subtractor 105 may subtract the prediction signal (through the line L103) from the signal of the subject block (through the line L102), to generate a residual signal. The residual signal may be processed, such as discrete-cosine-transformed, by the transformer 106, and its coefficients may be quantized by the quantizer 107. The quantized and transformed coefficients may be encoded by the entropy encoder 111, and may be output from the output terminal 112 together with the information regarding the prediction method.

In order to perform the intra prediction or the inter prediction of the following, or next in time, subject block, the compressed subject block signal may be inversely processed to be decompressed. That is, the quantized transform coefficients may be de-quantized by the de-quantizer 108, and then may be processed, such as inverse discrete cosine transformed, by the inverse-transformer 109 to decompress the residual signal. The decompressed residual signal and the prediction signal sent from the line L103 may be added by the adder 110, and the signal of the subject block may be reproduced and stored in the frame memory 104 as a reference picture. In this embodiment, although the transformer 106 and the inverse-transformer 109 are used, another transform process may be used instead of these transformers. According to circumstances, in some examples, the transformer 106 and the inverse-transformer 109 may be omitted.

Image Prediction Encoding Method

Figure 2:
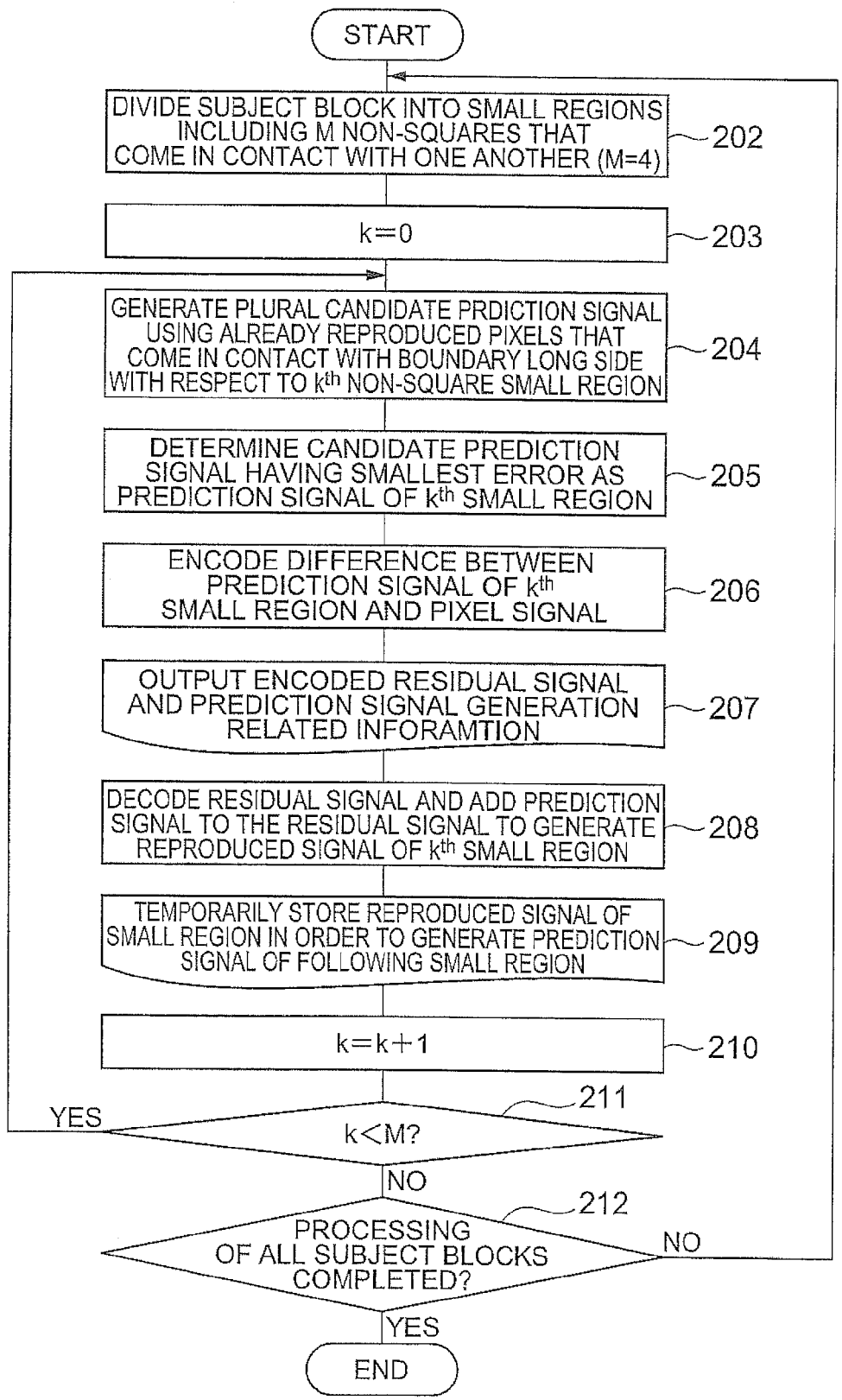
FIG. 2 is a flowchart illustrating an example of a picture prediction encoding method.
Figure 3:
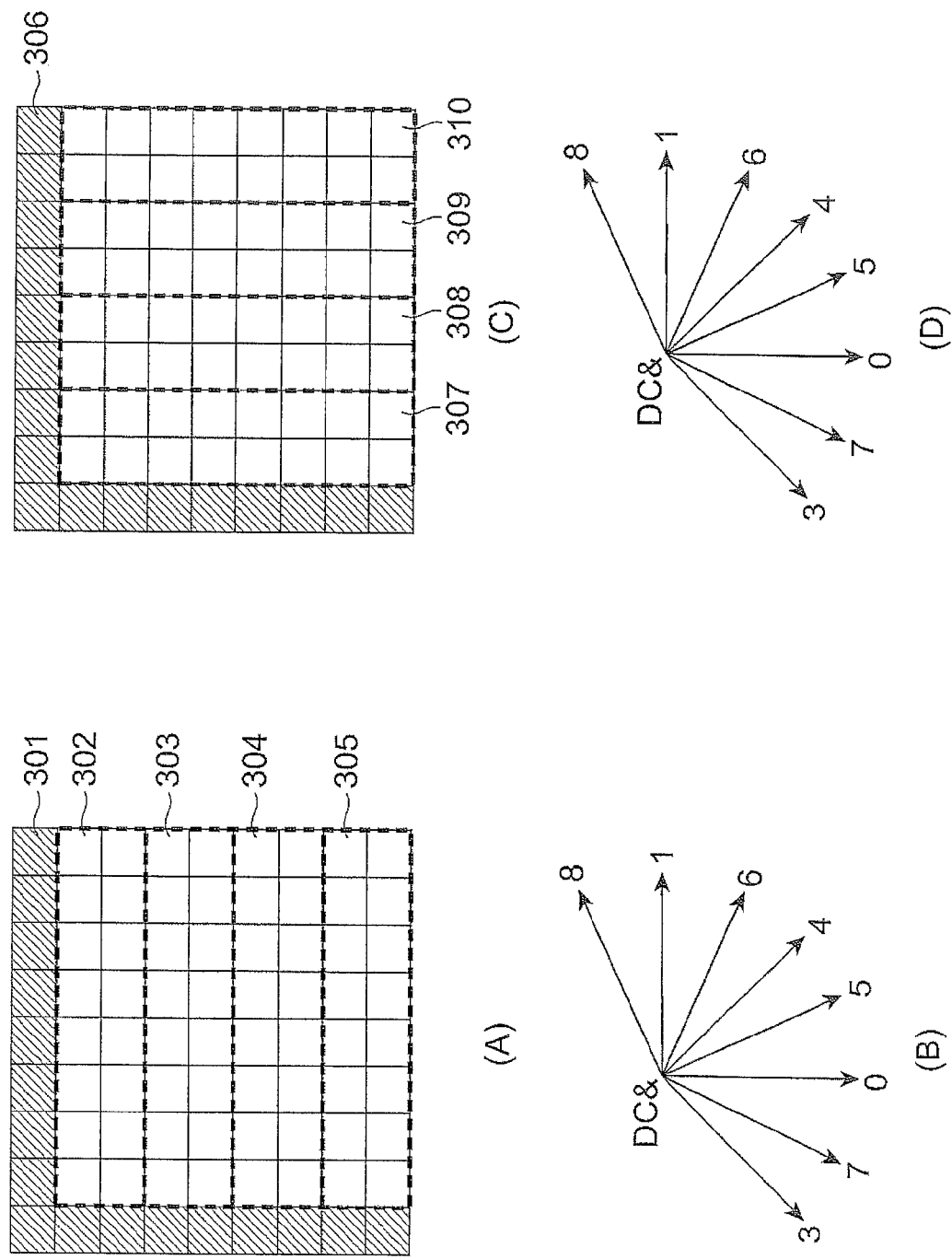
FIG. 3 is an example schematic diagram illustrating a first division method of a small region and a method of generating a prediction signal of the small region.

FIG. 2 is a flowchart illustrating example operation of the picture prediction encoding device 100 performing picture prediction encoding. Particularly, as described above, FIG. 2 illustrates a process for generating an intra prediction signal for each block of a block-divided picture. The prediction signal generator 103 in FIG. 1 may generate a picture prediction signal with the following method.

In step 202 of FIG. 2, the block divider 102 re-divides, or sub-divides the subject block having N×N pixels into a plurality of small regions or sub-regions, at least some of which are non-square shapes. In this embodiment, although the number N is 8 (N=8), it may be 16 (N=16) or another integer. One or more of the small regions may be formed to have a non-square shape. In this embodiment, the subject block is divided into M (here, for example, four) non-square shapes formed as rectangles, each of which is composed of N (horizontal)×N/4 (vertical) pixels, or M (here, for example, four) rectangles, each of which is composed of N/4 (horizontal)×N (vertical) pixels. The quantity of sub-regions (M) into which a subject block is sub-divided may be stored and used by a counter as later described. This division method is illustrated in FIGS. 3(A) and 3(C). In FIG. 3(A), one grid represents one pixel. In other examples, one grid may represent fewer or greater numbers of pixels. Pixel groups 302 to 305 surrounded by dashed lines representing the boundaries of the small regions are pixels of the subject block. A hatched pixel group 301 is an already reproduced pixel group that is adjacent to, and contiguous with, the subject block, and is disposed along the boundary of the pixel group 302. The pixel signal of the already reproduced pixel group is the pixel signal which was previously encoded and then decompressed in the past, and may be stored in the frame memory 104 as a reference image. In FIG. 3(A), the subject block is sub-divided into four small regions 302 to 305 each of which is horizontally long and is composed of 8 (horizontal)×2 (vertical) pixels. In FIG. 3(C), the subject block is divided into four small regions 307 to 310 each of which is vertically long and is composed of 2 (horizontal)×8 (vertical) pixels. Other divisions are possible and contemplated. As other division methods, for example, the subject block may be divided into two small regions each of which is horizontally long and is composed of N×N/2 pixels or two small regions each of which is vertically long and is composed of N/2×N pixels. In still other examples, division of the small regions, or sub-regions may be non-uniform such that some sub-regions include greater or fewer pixels than other sub-regions.

Next, a counter k for identifying small regions to be processed is initially set to "0" (step 203). The counter k may be a register, a storage location, or any other mechanism or device for maintaining a count of the number of sub-regions (M) that have been processed.

Then, processes in steps 204 to 209 to be described below are performed with respect to the respective small regions. First, the prediction signal generator 103 generates a plurality of candidate prediction signals with respect to a small region 302 ($0^{th}$ small region (k=0)) of FIG. 3(A) (step 204). In this embodiment, the prediction signal is generated by extrapolating the already reproduced pixel that comes in contact with the subject small region. Specifically, among the already reproduced pixel group 301, an already reproduced pixel that comes in contact with the upper and left sides of the small region 302 may be used. For example, the prediction methods may include a plurality of methods, such as the nine (9) methods described with reference to FIG. 15, including a method of extrapolating an average value DC of the already reproduced pixels as illustrated in FIG. 3(B). The prediction methods may include a method of extending and extrapolating the already reproduced pixels in directions described as 0 to 8. Although a concrete calculation method is the same as the method illustrated in FIG. 15, only 8×2 values are generated. In the next step 205, the prediction signal generator 103 may determine the small region 302 having the smallest error among a plurality of candidate prediction signals, such as among the nine (9) candidate prediction signals obtained by the nine (9) methods as described above as the prediction signal. In addition, the prediction signal generator 103 may determine the method of generating the determined prediction signal as a prediction mode (hereinafter referred to as "prediction signal generation related information"). In the next step 206, the subtractor 105 obtains a difference, or error, between the pixel signal of the small region 302 provided on line L102, and the prediction signal of the small region 302 provided on line L103 (FIG. 1). The transformer 106 may frequency-transform the obtained residual signal, and the quantizer 107 may quantize the transformed residual signal. The entropy encoder 111 may perform entropy encoding of the quantized signal with a code, such as a variable length code or an arithmetic code. Then, in the next step 207, entropy-encoded residual signal and the prediction signal generation related information obtained in step 205 are output from the output terminal 112.

The encoded signal of the small region 302 may be used in prediction of the small region 303 to be processed next. Because of this, the residual signal of the small region 302 may be de-quantized by the de-quantizer 108, frequency inverse-transformed by the inverse-transformer 109, and then added to the prediction signal obtained as above by the adder 110 to generate a reproduced signal of the small region 302 (step 208). Then, in order to generate the prediction signal of the following small region 303, the reproduced signal of the small region 302 is temporarily stored in the frame memory 104 as a reference image (step 209), and then the counter k is incremented by "1" (step 210).

The processes in the above-described steps 204 to 210 are performed with respect to the next small region 303 (that is, the first small region (k=1)). Among the already reproduced pixels of the small region 302 that is present just above the small region 303 and the pixels that belong to the pixel group 301 in FIG. 3(A), a pixel that is just on the left side of the small region 303 is used as the already reproduced pixel that is used at that time. In the same manner, the optimum method of generating a prediction signal may be determined, such as from the nine (9) modes illustrated in FIG. 3(B). Thereafter, the processes in steps 204 to 210 are performed in order with respect to the second and third small regions (k=2, 3) (that is, the processes are performed until k becomes "4" (k=4) that is equal to M and it is determined that k is not satisfied the condition of k<M in step 211).

Thereafter, the processes in the above-described steps 202 to 211 are executed with respect to the respective subject blocks, and when it is determined that the processing of all the subject blocks is completed in step 212, the process of FIG. 2 is finished.

On the other hand, in the case of the small region that is vertically long as illustrated in FIG. 3(C), the prediction encoding is initially performed with respect to the small region 307 in the same manner. At this time, when the prediction signal is generated, the already reproduced pixel that comes in contact with the left side and an upper side of the small region 307 of the already reproduced pixel group 306. Thereafter, the prediction encoding is performed in the order of the small regions 308, 309, and 310, and the prediction signals are generated using the already reproduced pixels of the small regions 307, 308, and 309 in the respective cases.

Since the division of the small regions is performed so that the small region has an elongated shape that comes in contact with the already reproduced pixel, the correlation between the generated prediction signal and the pixel signal to be encoded becomes higher, and thus the difference between the prediction signal and the subject signal can be kept low to reduce the encoded amount.

Figure 4:
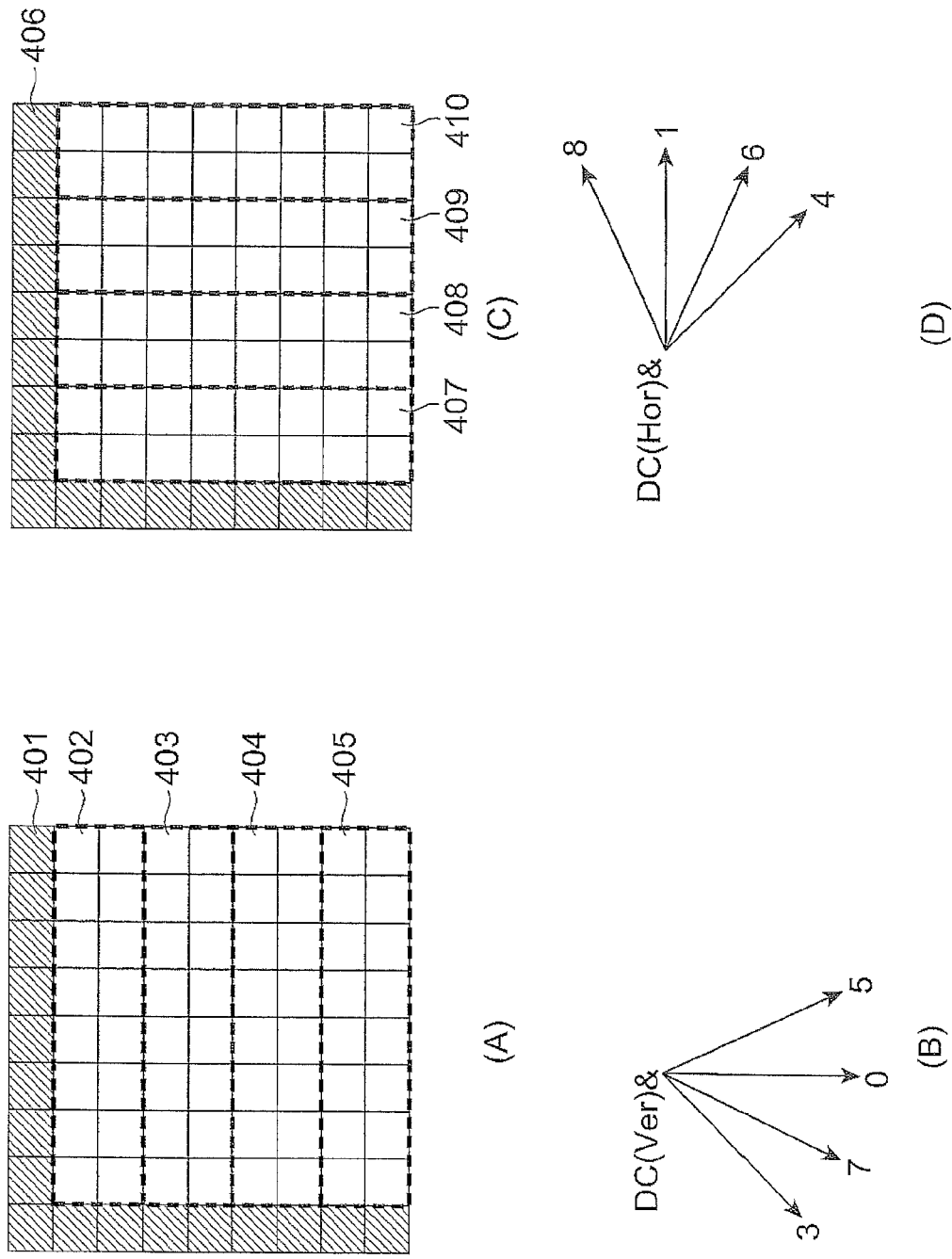
FIG. 4 is an example schematic diagram illustrating a second division method of a small region and a method of generating a prediction signal of the small region.

FIG. 4 illustrates an example of a first method of dividing small regions or sub-regions, and a second method of generating prediction signals of the small regions. Although the method of dividing the small regions in FIG. 4 is substantially similar as that in FIG. 3, a method of generating prediction signals is limited according to the respective division methods. In FIG. 4(A), the subject block may be divided into small regions 402 to 405 each of which is horizontally long. The prediction signals for the small regions 402 to 405, as illustrated in FIG. 4(B), may be generated by an extrapolating method in the downward direction from the already reproduced pixel signal 401 that is present on the upper side of the small regions. In addition or alternatively, an average value of the pixels that are present on the upper side of the small regions may be used (in FIG. 4(B), the average value is written as "DC (Ver)"). On the other hand, in the case of a vertically long division shape as illustrated in FIG. 4(C), the prediction signals for the small regions 407 to 410, as illustrated in FIG. 4(D), are generated by an extrapolating method in the rightward direction from the already reproduced pixel signal 406 that is present in the leftward direction of the small regions. In addition or alternatively, an average value of the pixels that are present in the left direction of the small regions may be used (in FIG. 4(D), the average value is written as "DC (Hor)"). That is, in the case of the division in the horizontal direction, the pixels are extrapolated in the vertical direction, while in the case of the division in the vertical direction, the pixels are extrapolated in the horizontal direction. In other words, the prediction signals may be generated using the already reproduced pixels that come in contact with the boundary of a long side of the non-square small region.

By generating the small region division and the prediction signals in the above-described example shapes, the subject small region constantly comes in contact with the already reproduced pixels, and thus the prediction signals having high correlation with the signals of the subject small region are generated. Accordingly, the difference or error can be kept low, and the code amount can be reduced.

Example of Switching and Encoding a Plurality of Shapes as Shapes of Sub-Regions]

Figure 5:
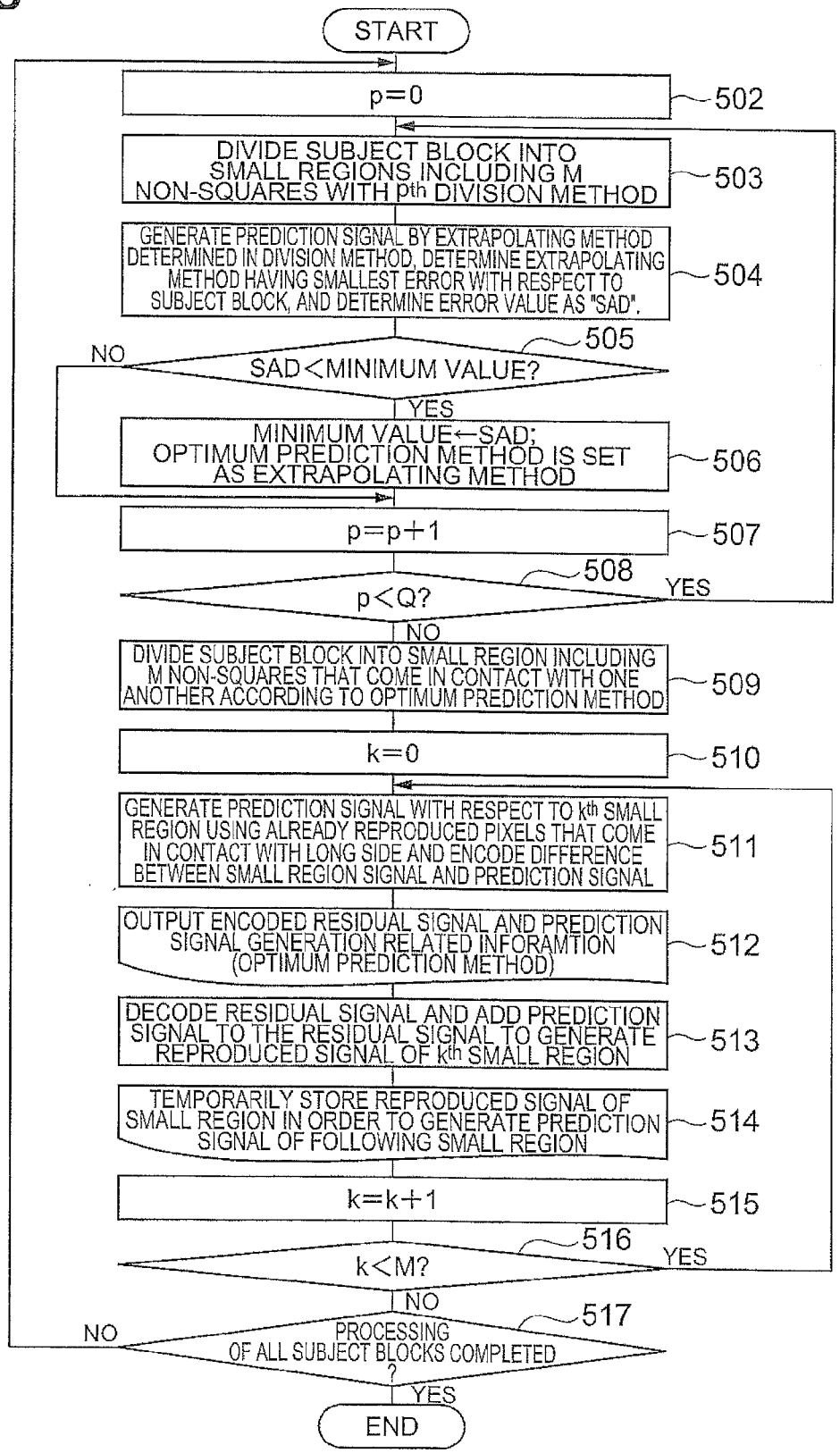
FIG. 5 is a flowchart illustrating an example of a picture prediction encoding method in the case where a plurality of division shapes are present.

As described above, FIGS. 2, 3, and 4 illustrate an embodiment in the case where the shapes of the small regions are constantly the same through the whole picture. However, it is not essential that the shapes of the small regions are constantly the same, or uniform, through the whole picture or the subject block. Hereinafter, as the shape of the small region, an embodiment of switching among a plurality of shapes according to the property of the signals and encoding will be described. FIG. 5 is a flowchart illustrating an example picture prediction encoding method in the case where a plurality of division shapes are used.

Figure 6:
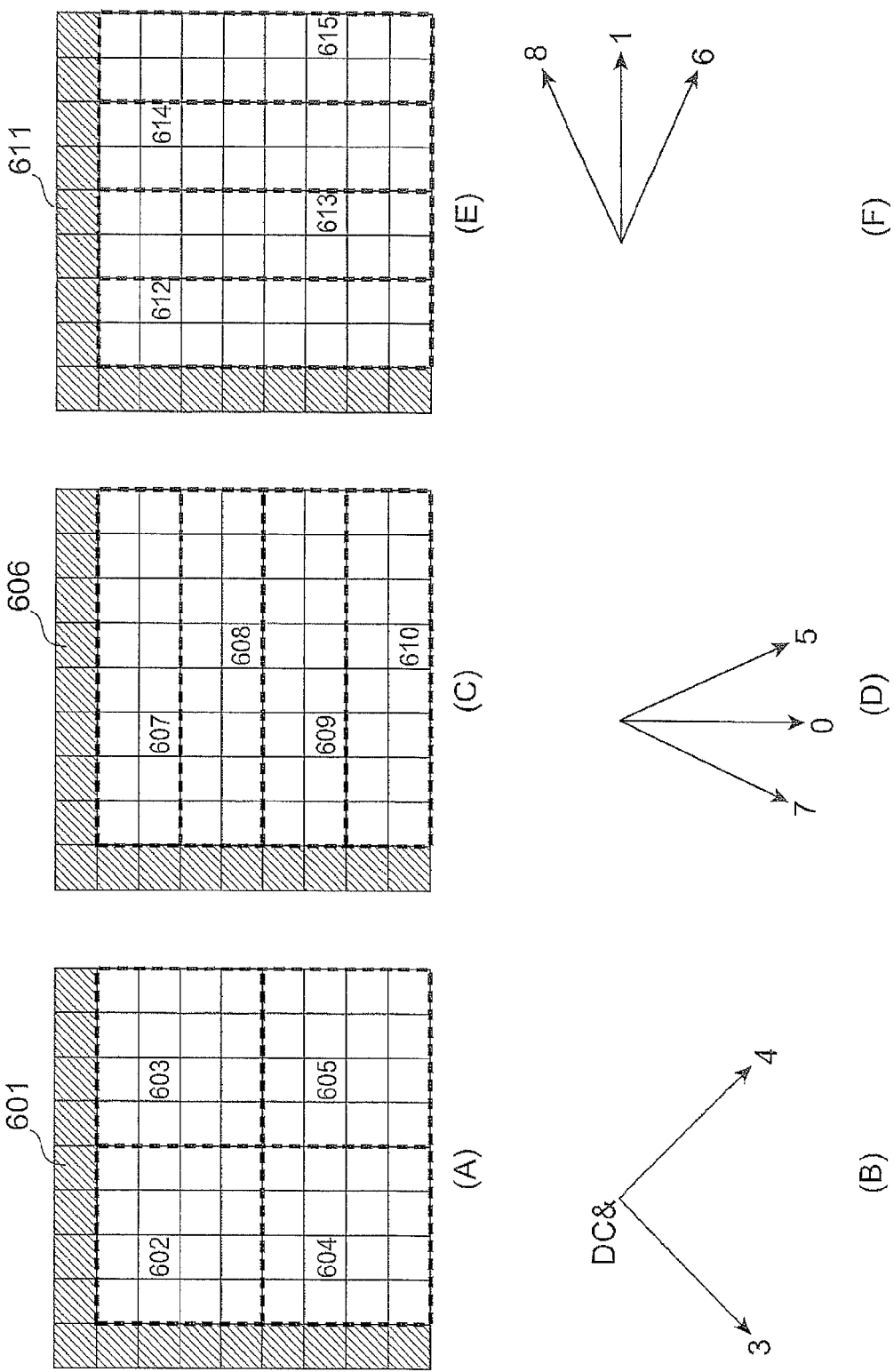
FIG. 6 is an example schematic diagram illustrating a method of dividing a small region and a method of generating a prediction signal of the small region in the case where a plurality of division shapes are present.

First, in step 502 of FIG. 5, a division counter p for identifying the division methods is initially set to "0". In the next step 503, the subject block having N×N pixels is re-divided, or sub-divided, into a plurality of small regions, or sub-regions, according to a method of dividing the $p^{th}$ small region (initially, a method of dividing $0^{th}$ small region). In this embodiment, Q kinds (here, for example, three kinds) of division methods are used. In other examples, any other number of different division techniques may be used to form different shapes of the sub-regions. FIG. 6 illustrates an example of the three kinds of division methods and a method of generating a prediction signal used for each division method. FIG. 6(A) shows a method of dividing a subject block into four square small regions 602 to 605 that corresponds to p=0. FIG. 6(C) shows a method of dividing a subject block into four horizontally long small regions 607 to 610 that corresponds to p=1. FIG. 6(E) shows a method of dividing a subject block into four vertically long small regions 612 to 615 that corresponds to p=2. In this case, instead of the methods of FIGS. 6(C) and 6(E), the subject block may be divided into two horizontally long small regions or two vertically long small regions. In this embodiment, with respect to the division method of FIG. 6(A), the prediction signal is generated in the prediction method (DC mode, modes 3 and 4) as illustrated in FIG. 6(B). With respect to the division method of FIG. 6(C), the prediction signal is generated in the prediction method (modes 0, 5 and 7) as illustrated in FIG. 6(D). With respect to the division method of FIG. 6(E), the prediction signal is generated in the prediction method (modes 1, 6 and 8) as illustrated in FIG. 6(F).

In the next step 504, prediction signals of the respective small regions 602 to 605 are generated using a prediction method (extrapolating method) that is allocated to the method of dividing the $p^{th}$ (p=0) small region. The extrapolating method in the case of p=0 corresponds to a DC mode, mode 3 and 4 as indicated in FIG. 6(B). In this embodiment, since a common method is used with respect to all the small regions, a first prediction signal for four small region is generated in a first mode (DC mode), a second prediction signal for four small regions is generated in a second mode (mode 3), and a third prediction signal for four small regions is generated in a third mode (mode 4). With respect to the 3 prediction signals generated as above, differences (error) between the prediction signals and the pixel signal of the subject block are obtained or determined. A prediction method (such as an extrapolating method) that provides a determined criteria, such as the smallest one of the three obtained differences, is determined, and the sum of absolute values of the differences (SAD) (that is, the sum of absolute values of the differences of the four small regions) in the case of the above-described example prediction method is considered as "an error amount SAD". In this case, although sequentially generation of the prediction signals of the respective small regions using the reproduced signal of the preceding small region is described, in step 504, the reproduced signal of the small region is approximated in a simple method. That is, the difference between the small region and the prediction signal may be de-quantized after being quantized, and the prediction signal may be added to the residual signal that includes a quantization error to approximate the reproduced signal of the small region. The prediction signal of the following small region may be generated using the reproduced signal approximated as previously described.

In the next step 505, the error amount, such as the error amount SAD, is compared with an error amount by another division method, and if the error amount SAD becomes smaller than the error amount by another division method, the minimum value of SAD and the optimum prediction method are updated (step 506).

Thereafter, the processes in steps 503 to 506 may be repeated Q times that is the number of kinds of division methods based on the division counter. That is, after performing the processes in the case of p=0, 1, and 2, the optimum prediction signal generation method is determined (steps 507 and 508). Alternatively, the processes in steps 503 to 506 may be repeated up to Q times, or until an error amount is determined that is at or below a determined threshold.

In accordance with the example optimum prediction signal generation method determined as above, the subject block is re-divided into M (in this embodiment, M=4) non-square small regions which come in contact with one another (step 509).

Next, the region counter k for identifying the small region to be processed is initially set to "0" (step 510).

Then, processes in the following steps 511 to 514 are performed with respect to the respective small regions. First, in step 511, the prediction signal generator 103 may generate a prediction signal in accordance with the optimum prediction signal generation method with respect to the $k^{th}$ small region (subject small region) of the divided small regions. Next, the subtractor 105 may obtain a difference between the pixel signal of the subject small region and the prediction signal of the subject small region, the transformer 106 may frequency-transform the obtained residual signal, and the quantizer 107 may quantize the transformed residual signal to match the division shape of the subject small region. Then, the entropy encoder 111 may perform entropy encoding of the quantized signal. That is, as the frequency transform to match the division shape of the subject small region, for example, a 4×4 frequency transform is performed in the case where the subject small region is divided as 4×4 pixels, a 8×2 frequency transform is performed in the case where the subject small region is divided as 8×2 pixels, and a 2×8 frequency transform is performed in the case where the subject small region is divided as 2×8 pixels. On the other hand, the quantization may be performed by weighting coefficients of the inclination according to the division shape.

In the next step 512, the residual signal obtained through the encoding and the prediction signal generation related information that indicates the optimum prediction method are output from the output terminal 112.

The encoded signal of the subject small region as described above may be used for prediction of the following small region. Because of this, the residual signal of the subject small region is de-quantized by the de-quantizer 108, frequency inverse-transformed by the inverse-transformer 109, and then added to the prediction signal obtained as above by the adder 110 to generate a reproduced signal of the subject small region (step 513). Then, in order to generate the prediction signal of the following small region, the reproduced signal of the subject small region is temporarily stored in the frame memory 104 (step 514). Thereafter, the region counter k is incremented by "1" (step 515).

The processes in the above-described steps 511 to 515 are performed with respect to the next subject small region (that is, the first small region (k=1)). Thereafter, the processes in steps 511 to 515 are performed in order with respect to the second and third small regions (k=2, 3) (that is, the processes are performed until k becomes "4" (k=4) that is equal to M and it is determined that k is not satisfied the condition of k<M in step 516).

Thereafter, the processes in the above-described steps 502 to 516 are executed with respect to the respective subject blocks, and when it is determined that the processing of all the subject blocks is completed in step 517, the process of FIG. 5 is finished.

In this embodiment, the prediction signal generation related information is output as control information together with the residual signal obtained through the encoding. However, it is to be noted that information on the division method or shape of the subject block and information for designating the frequency transform method or the quantization method may not be output to the decoder. This is because the division method of the subject block may be determined based on the prediction signal generation related information, and accordingly, the frequency transform method or the quantization method can be automatically determined by the decoder. For example, if the prediction mode is any one of mode 0, mode 5, and mode 7 in FIGS. 6(C) and 6(D), it may be determined that the small region in the subject block is horizontally long, and thus the frequency transform method or the quantization method may be determined with respect to the horizontally long small region. Accordingly, it may not be necessary to send side information to the decoder, except for the prediction signal generate related information.

Also, in this embodiment, the optimum division method and prediction signal generation method according to the picture signal can be used, and thus encoding efficiency can be further improved. In other words, the division of the subject block into sub-regions may be dynamically selected or changed based on changes in the image content between adjacent contiguous subject blocks, and/or adjacent contiguous sub-regions. For example, with respect to an even signal, or slowly evolving image signal, of which the amplitude is not greatly changed, the subject block may be divided so that the small region becomes square, and the prediction is performed by the average value of the neighboring already reproduced pixels. Also, in the case where the signal is changed in the vertical direction, the subject block may be divided into horizontally long small regions as illustrated in FIG. 6(C), and the neighboring already reproduced pixels are extrapolated in the vertical direction. In the case where the signal is changed in the horizontal direction, the subject block may be divided into vertically long small regions as illustrated in FIG. 6(E), and the neighboring already reproduced pixels are extrapolated in the horizontal direction. Accordingly, the pixels of the subject small region may constantly approximate the already reproduced pixels, and thus the prediction signal having high correlation with respect to the signal of the subject small region can be generated. Accordingly, the encoding amount can be reduced by keeping the difference low.

Figure 7:
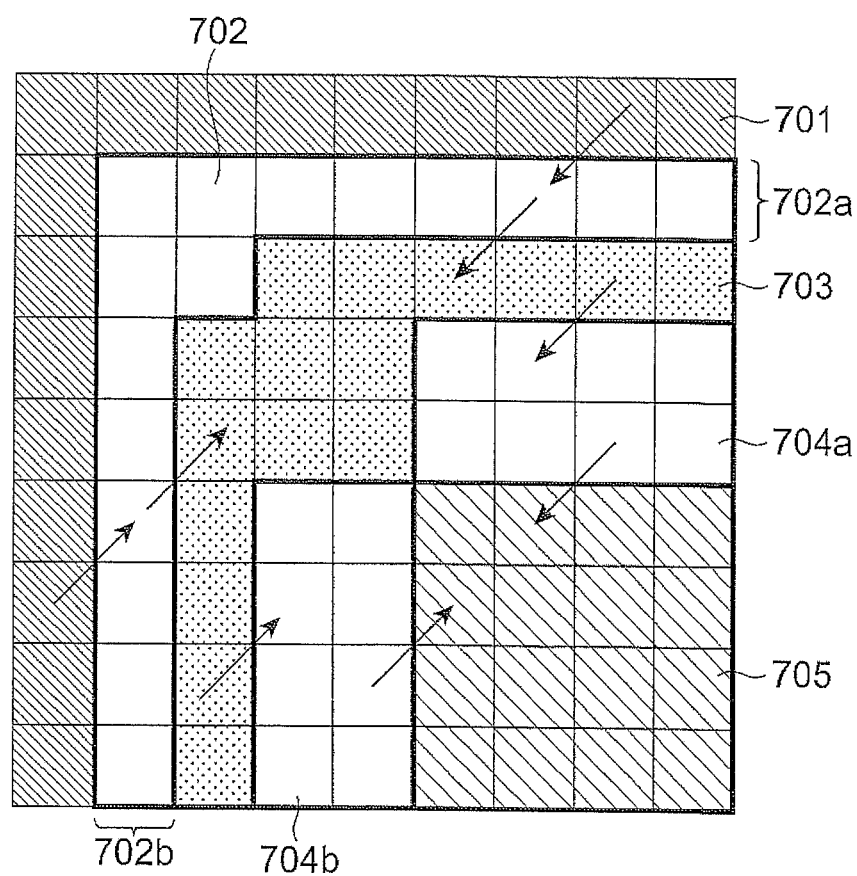
FIG. 7 is an example schematic diagram illustrating a third division method of a small region and a method of generating a prediction signal of the small region.

In addition to the square small region, a dynamically evolving block division method as illustrated in the example of FIG. 7 may be adopted. Although the pixel group 701 in FIG. 7 corresponds to the already reproduced pixels, the subject block may be dynamically divided into small regions so that the small regions are formed with a shape (such as a generally reversed L shape) according and generally conforming to the pixel group 701. If so, in the example small region or sub-region 702, the length of the sides 702a and 702b that do not come in contact with the already reproduced pixels 701 corresponds to one pixel, and thus is considerably shortened, and the side that comes in contact with the already reproduced pixels 701 can be lengthened. In this case, the prediction value of the pixel that is adjacent to the already reproduced pixels is generated using the already reproduced pixels, and thus a signal having very high correlation can be generated. In the same manner in the small region 703, the prediction signal having high correlation with the already reproduced pixels can be generated based on the reproduced signal of the small region 702. At this time, in the example of FIG. 7, a square small region 705 is present, and a square small region and a non-square small region coexist.

Image Prediction Decoding Device

Figure 8:
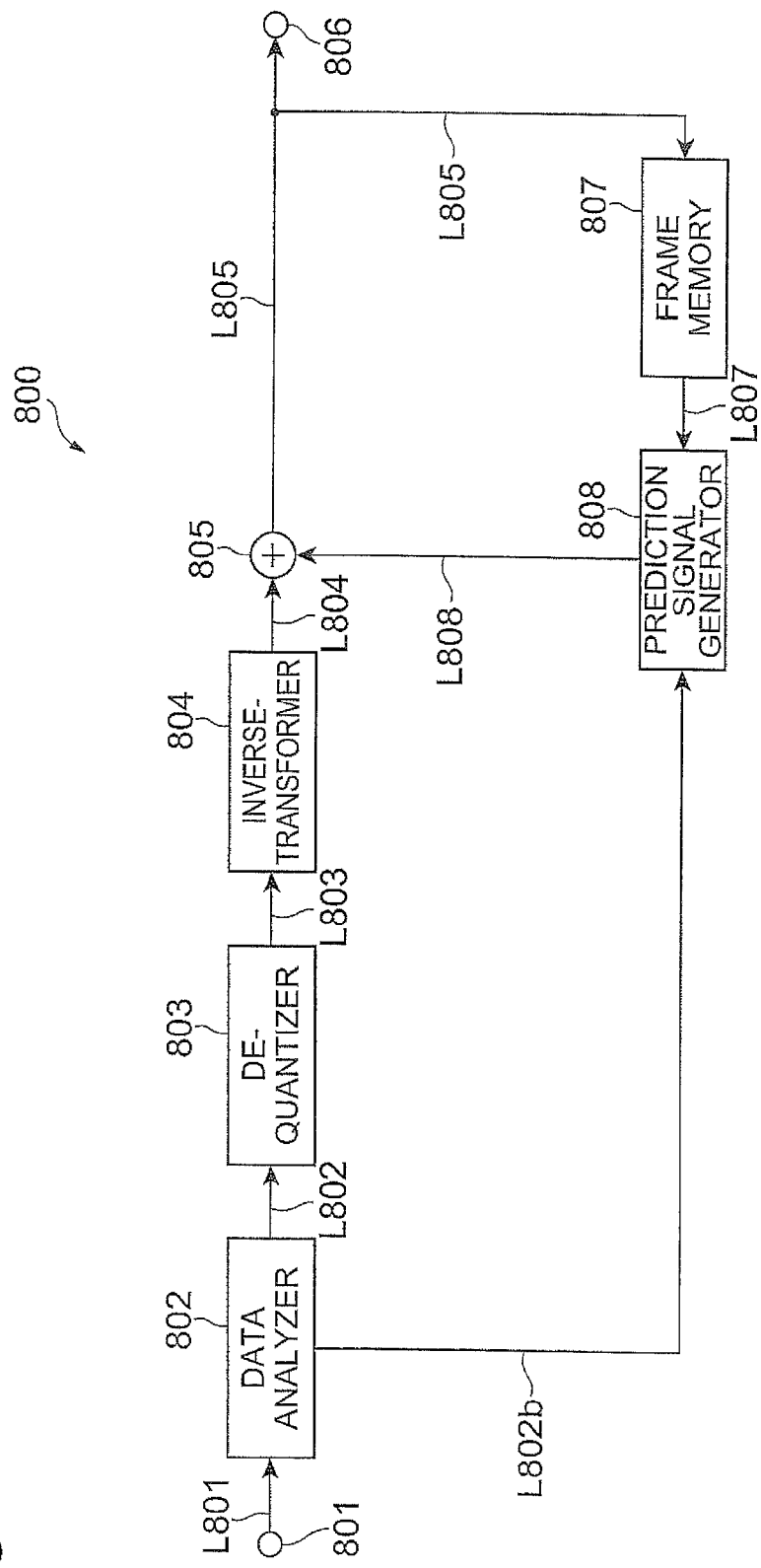
FIG. 8 is a block diagram illustrating an example configuration of a picture prediction decoding device.

Next, a picture prediction decoding device/method will be described. FIG. 8 is a block diagram illustrating an example configuration of an image prediction decoding device, or a picture prediction decoding device 800. The picture predicting decoding device 800 or image prediction decoding device may be a computing device or computer, including for example software, hardware, or a combination of hardware and software, as described later, capable of performing the described functionality. The image prediction decoding device 800 may be one or more separate systems or devices, may be one or more systems or devices included in the image encoding/decoding system, or may be combined with other systems or devices within the image encoding/decoding system. In other examples, fewer or additional blocks may be used to illustrate the functionality of the image prediction decoding device 800. As illustrated in FIG. 8, the picture prediction decoding device 800 may include an input terminal 801, a data analyzer 802, a de-quantizer 803, an inverse-transformer 804, an adder 805, a prediction signal generator 808, a frame memory 807, and an output terminal 806. In one example configuration, the data analyzer 802, the de-quantizer 803, and the inverse-transformer 804 may be considered "a decoding unit.". However, in other examples, another configuration of components included in the image prediction decoding device may be considered as the decoding unit. For example, the inverse-transformer 804 may be omitted. The functionality included in the picture prediction decoding device 800 may be modules or units. The term "module" or "unit" may be defined to include one or more executable parts of the image encoding/decoding system. As described herein, the modules and/or units are defined to include software, hardware or some combination thereof executable by a processor (described later). Software included in the modules and/or units may include instructions stored in memory or a computer readable medium that are executable by the processor, or any other processor. Hardware included in the modules and/or units may include various devices, components, circuits, gates, circuit boards, and the like that are executable, directed, and/or controlled for performance by the processor.

Hereinafter, operational examples of the picture prediction decoding device will be described. The compressed data compression-encoded by the above-described method in the picture prediction encoding device may be input from the input terminal 801. This compressed data may include a residual signal obtained by prediction-encoding the subject block that is obtained by dividing a picture into a plurality of blocks and information related to the generation of a prediction signal. Among them, as the information related to the generation of the prediction signal, as illustrated in the example of FIG. 16, may include information of any one of nine (9) modes including a DC mode that is a method of generating a prediction signal by an average value of the neighboring already reproduced pixels and modes 0, 1, 3, 4, 5, 6, 7, and 8 that are methods of generating a prediction signal by extending and extrapolating the already reproduced pixels in predetermined directions.

The data analyzer 802 may extract the compressed information such as quantized transform coefficients (transform coefficients obtained by quantizing the residual signal of the subject block), information related to the generation of the prediction signal, and quantization parameters from the input compressed data. The quantized transform coefficients and the quantization parameters may be output to the de-quantizer 803 through a line L802. The de-quantizer 803 may inverse-quantize the quantized transform coefficients based on the quantization parameters, and the inverse-transformer 804 may perform inverse discrete cosine transform of the result. The residual signal decompressed as above may be sent to the adder 805 through a line L804. The above-described example processes are performed for each small region included in the subject block, and the details thereof will be described later.

On the other hand, the information related to the generation of the prediction signal may be sent to the prediction signal generator 808 through a line L802b. The prediction signal generator 808 may acquire a reference signal from the frame memory 807 based on the information related to the generation of the prediction signal, and may generate the prediction signal in the method to be described later. The prediction signal may be sent to the adder 805 through a line L808, and the adder 805 may add the prediction signal to the decompressed residual signal to reproduce the subject block signal, output the reproduced subject block signal to outside through a line L805 and store the reproduced subject block signal in the frame memory 807 at the same time.

Image Prediction Decoding Method

Figure 9:
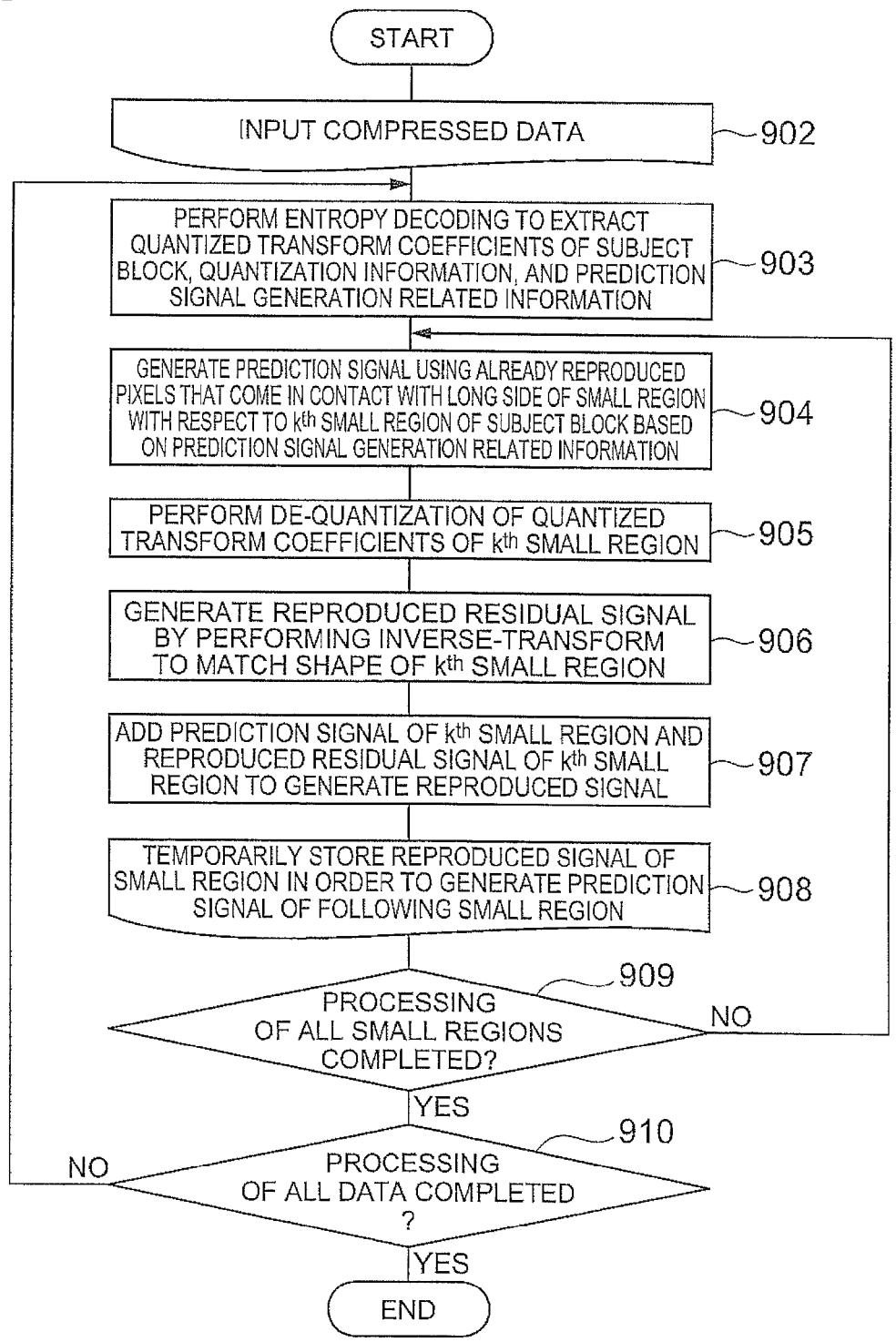
FIG. 9 is a flowchart illustrating an example of a picture prediction decoding method.

Next, using FIG. 9, an example process based on the picture prediction decoding method will be described. In step 902 of FIG. 9, the compressed data is input, and in the next step 903, the data analyzer 802 performs entropy decoding of the compressed data to extract the quantized transform coefficients (transform coefficients obtained by quantizing the residual signal of the subject block), quantization parameters, and prediction signal generation related information. Here, the subject blocks to be decoded may be divided in the same or a similar method, and as indicated in any one of FIGS. 3(A), 3(C) and 7, the subject block may be divided into a plurality of small regions, or sub-regions, that come in contact with one another. The small region may have an elongated shape so as to greatly come in contact, or have significant contiguous contact, with the already reproduced pixels. The following decoding/reproduction processes (steps 904 to 908) may be sequentially performed in the small region unit. Although the description is omitted in FIG. 9, in order to sequentially perform the decoding/reproduction processes (steps 904 to 908) in the small region unit, the processing order is determined with respect to the respective small regions to be processed, the current small region to be processed is determined as the $k^{th}$ small region, and the region counter k is sequentially incremented by one.

In step 904, the prediction signal generator 808 generates the prediction signal with respect to the current small region to be processed ($k^{th}$ small region; referred to as a "subject small region") based on the prediction signal generation related information. Specifically, a method of generating the prediction signal by an average value of the corresponding already reproduced pixels using the already reproduced pixels that are adjacent to, or contiguous with, the subject small region, or a method of generating the prediction signal by extending and extrapolating the already reproduced pixels in predetermined directions may be adopted. In other words, the prediction signal is generated by a method that is specified by the prediction signal generation related information among a plurality of modes, such as the nine (9) modes illustrated in FIG. 3(B) or 3(D) as described above. Also, the prediction signal may be generated by mainly using the already reproduced pixels that come in contact with, or are contiguous with the long side of the small region or sub-region. For example, in the case of dividing the subject block in the horizontal direction as illustrated in FIG. 4(A), the pixels are extrapolated in the vertical direction or in the direction close to the vertical direction as illustrated in FIG. 4(B), while in the case of dividing the subject block in the vertical direction as illustrated in FIG. 4(C), the pixels are extrapolated in the horizontal direction or in the direction close to the horizontal direction as illustrated in FIG. 4(D).

In the next step 905, the quantized transform coefficients of the subject small region ($k^{th}$ small region) and the quantization parameters are output to the de-quantizer 803, and the de-quantizer 803 may perform de-quantization of the quantized transform coefficients based on the quantization parameters. In the next step 906, the inverse-transformer 804 may perform inverse discrete cosine transform with respect to the result of de-quantization to substantially match the shape of the subject small region ($k^{th}$ small region) to generate the reproduced (decompressed) residual signal. The reproduced residual signal may be sent to the adder 805 through the line L804.

In the next step 907, the adder 805 may add the reproduced residual signal to the prediction signal of the subject small region ($k^{th}$ small region) to generate the reproduced pixel signal. The reproduced pixel signal may be temporarily stored in the frame memory as a reference image in order to reproduce the pixel signal of the next adjacent or contiguously disposed small region (step 908).

The decoding/reproduction processes in the above-described steps 904 to 908 may be sequentially executed with respect to all the small regions of the subject block. If the decoding/reproduction processes in the steps 904 to 908 are completed with respect to all the small regions of the subject block, an affirmative decision is made in step 909, and it is decided in step 910 whether the processes are completed with respect to all the subject blocks. If the processes are not completed with respect to all the subject blocks, the processing returns to step 903, and the processes are performed with respect to the subject block of which the process has not yet been completed. If the processes are completed with respect to all the subject blocks, an affirmative decision is made in step 910, and the processes of FIG. 9 are finished.

Here, in the case where the small region to be decoded comes in contact with an adjacent block of which the decoding/reproduction processes have been completed, it is preferable that the already reproduced pixels of the corresponding contiguous or adjacent block are used, while in the case where a first small region to be decoded comes in contact with a second small region of which the decoding/reproduction processes have been completed in the same block, it is preferable that the prediction signal is generated using the already reproduced pixels of the corresponding second small region. In any case, since the generated prediction signal is used for the reproduction of the subject pixel that is in the neighborhood of the already reproduced pixel, the approximate accuracy of the corresponding prediction signal is optimized, and encoding efficiency is improved.

Figure 10:
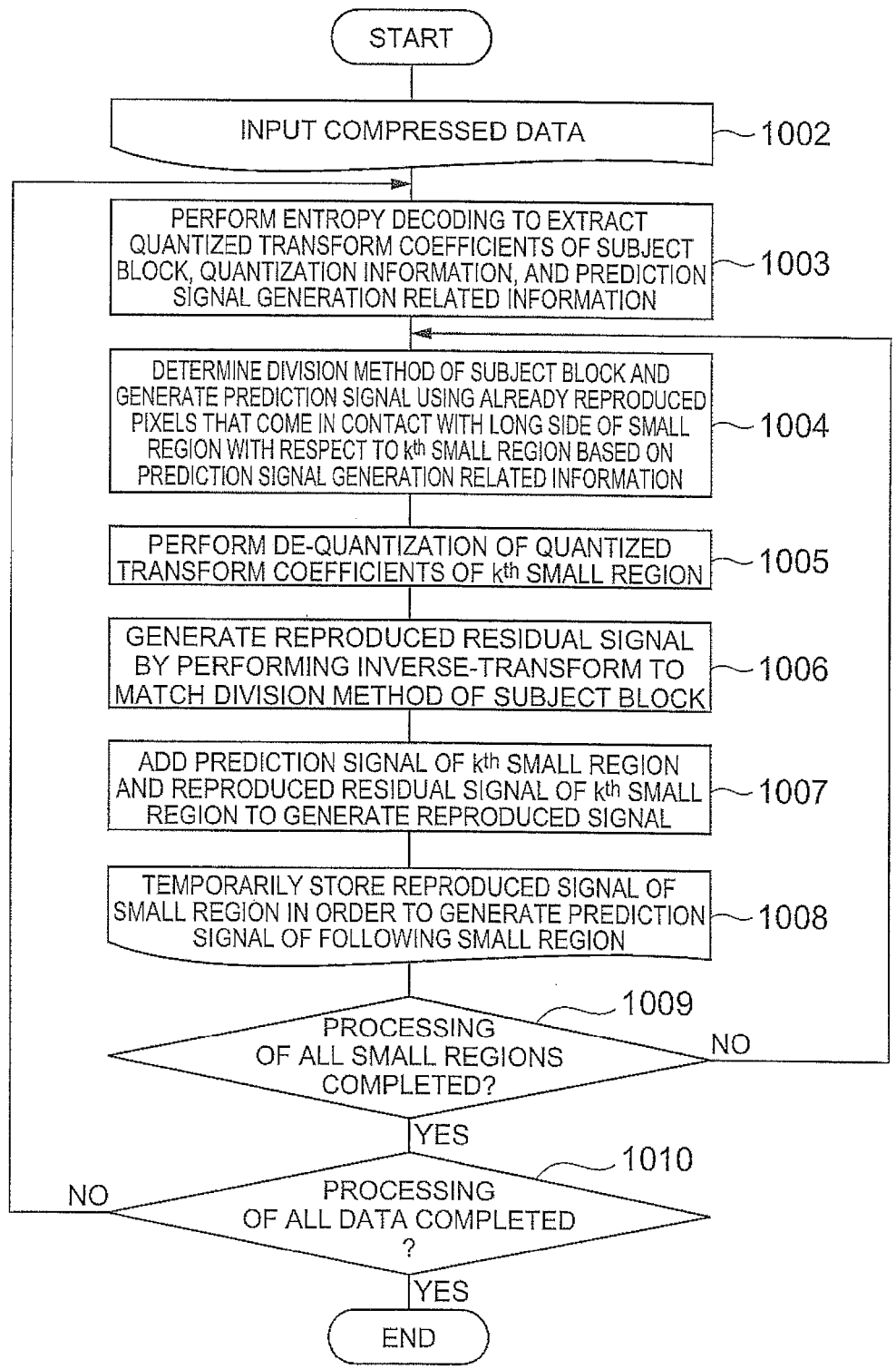
FIG. 10 is a flowchart illustrating an example of a picture prediction decoding method in the case where a plurality of division shapes are present.

Image Prediction Decoding Method Example Where a Plurality of Division Shapes are Present FIG. 10 illustrates an example process based on a picture prediction decoding method in the case where a plurality of different division shapes are present. That is, the subject blocks to be decoded are not divided into sub-regions in the same method, but are instead dynamically divided in any one of a plurality of methods, such as the methods described in FIGS. 6(A), 6(C) and 6(E). Also, it is to be noted that the method of generating a prediction signal may be determined as in FIGS. 6(B), 6(D), and 6(F) by the division method used.

In step 1002 of FIG. 10, the compressed data is input, and in the next step 1003, the data analyzer 802 may perform entropy decoding of the compressed data to extract the quantized transform coefficients (transform coefficients obtained by quantizing the residual signal of the subject block), quantization parameters, and prediction signal generation related information.

The following decoding/reproduction processes (steps 1004 to 1008) are sequentially performed in the above-described small region unit. Although the description is omitted in FIG. 10, in order to sequentially perform the decoding/reproduction processes (steps 1004 to 1008) in the small region unit, the processing order may be determined with respect to the respective small regions to be processed, the current small region to be processed is determined as the $k^{th}$ small region, and the region counter k is sequentially incremented by one.

In step 1004, the prediction signal generator 808 may specify the division method of the subject block based on the prediction signal generation related information. By specifying the division method of the subject block, the shape of the small region may be determined, and the shape of the generated prediction signal may be determined. Here, as illustrated in the example of FIG. 13, block division as illustrated in FIG. 6(A) may be determined in the case where the prediction mode is any one of mode 2 (DC mode), mode 3 and mode 4 by the prediction signal generation related information, block division as illustrated in FIG. 6(C) may be determined in the case where the prediction mode is any one of mode 0, mode 5 and mode 7, and block division as illustrated in FIG. 6(E) may be determined in the case where the prediction mode is any one of mode 1, mode 6 and mode 8. Also, the prediction signal generator 808 may generate the prediction signal of the subject small region to substantially match the shape of the current small region ($k^{th}$ small region; also referred to as a "subject small region") to be processed in accordance with the determined prediction mode.

In the next step 1005, the quantized transform coefficients of the subject small region ($k^{th}$ small region) and the quantization parameters are output to the de-quantizer 803, and the de-quantizer 803 may perform de-quantization of the quantized transform coefficients based on the quantization parameters. In the next step 1006, the inverse-transformer 804 may perform inverse discrete cosine transform with respect to the result of de-quantization to match the shape of the subject small region ($k^{th}$ small region) to generate the reproduced (decompressed) residual signal. The reproduced residual signal may be sent to the adder 805 through the line L804. Here, the weighting coefficients of the de-quantization may be selected to match the shape of the small region, and the de-quantization may be performed by the selected weighting coefficients. Also, regarding the inverse-transform (such as an inverse discrete cosine transform) from the frequency domain to the pixel domain, an inverse transform may be performed. For example, a 4×4 inverse-transform is performed in the case of the small region that is obtained by dividing the subject block into 4×4 small regions, a 8×2 inverse-transform is performed in the case of the small region that is obtained by dividing the subject block into 8×2 small regions, and a 2×8 inverse-transform is performed in the case of the small region that is obtained by dividing the subject block into 2×8 small regions. In any case, the inverse-transform method may be uniquely determined based on the prediction signal generation related information, in the absence of any side information, as previously discussed.

In the next step 1007, the adder 805 may add the reproduced residual signal to the prediction signal of the subject small region ($k^{th}$ small region) to generate the reproduced pixel signal. The reproduced pixel signal may be temporarily stored in the frame memory in order to reproduce the pixel signal of the next adjacent or contiguous small region (step 1008).

The decoding/reproduction processes in the above-described steps 1004 to 1008 are sequentially executed with respect to all the small regions of the subject block. If the decoding/reproduction processes in the steps 1004 to 1008 are completed with respect to all the small regions of the subject block, an affirmative decision is made in step 1009, and it is determined in step 1010 whether the processes are completed with respect to all the subject blocks. If the processes are not completed with respect to all the subject blocks, the processing returns to step 1003, and the processes are performed with respect to the subject block of which the process has not yet been completed. If the processes are completed with respect to all the subject blocks, an affirmative decision is made in step 1010, and the processes of FIG. 10 are finished.

As described above, encoding efficiency can be improved by using a plurality of division methods and prediction signal generation method according to the image or picture signal. Also, in spite of dynamically switching and using the plurality of division methods, the plurality of de-quantization methods, and the plurality of inverse-transform methods, the division method, the de-quantization method, and the inverse-transform method may be uniquely determined using the prediction signal generation related information without side information, and thus the entire code amount can be kept low.

Image Prediction Encoding program and Image Prediction Decoding Program

The image encoding/decoding system includes a picture prediction encoding program for causing a computer to function as the picture prediction encoding device. Also, the image encoding/decoding system includes a picture prediction decoding program for causing a computer to function as the picture prediction decoding device. Also, the picture prediction encoding program and the picture prediction decoding program may be stored in and provided from a non-transitory recording medium, computer readable medium and/or memory. Instructions in the form of computer software, firmware, data or any other form of computer code and/or computer program readable by a computer within the image encoding and decoding system may be stored in the non-transitory recording medium. Here, examples of the recording medium, computer readable medium, and/or memory include a recording medium such as a flexible disk, a CD-ROM, a DVD, a ROM, or the like, or a semiconductor memory or the like.

Figure 11:
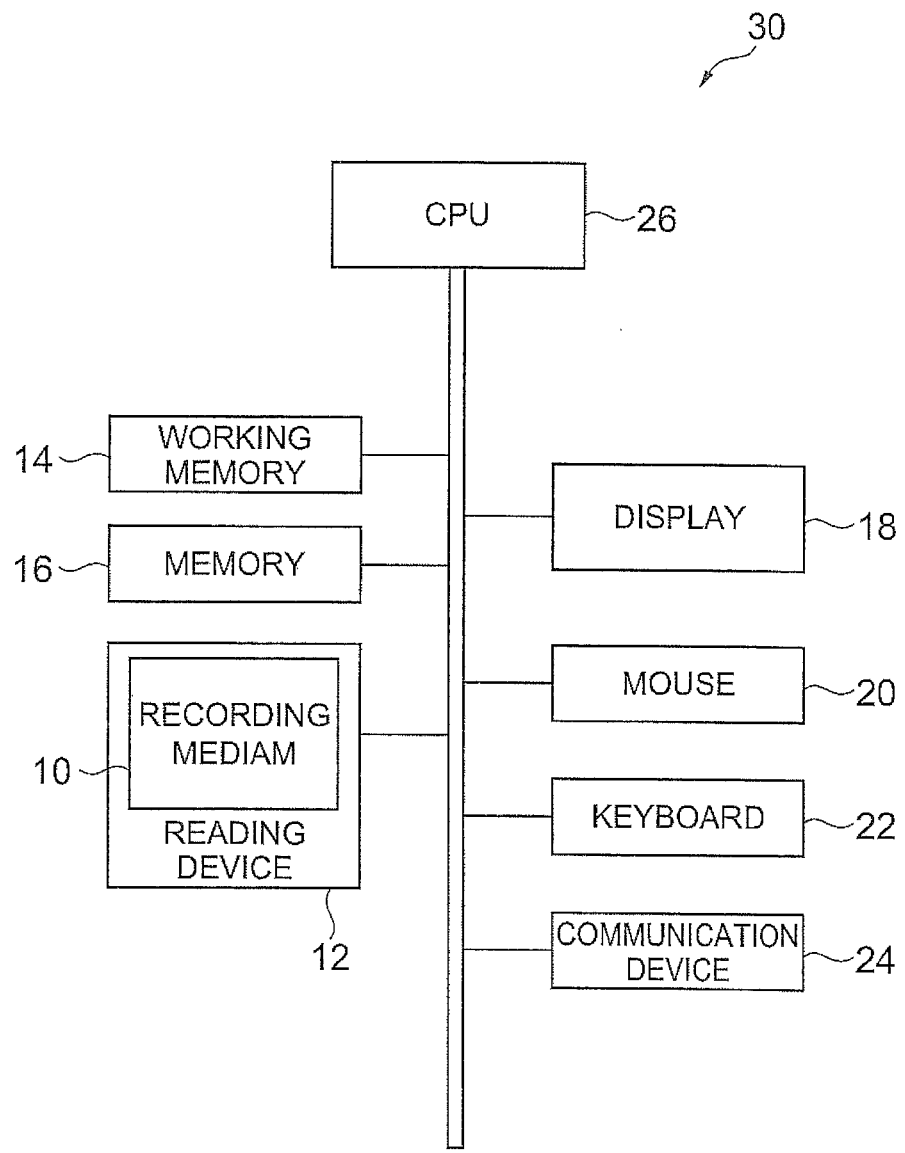
FIG. 11 is a configuration diagram of an example of a computer for executing a program recorded in a recording medium.
Figure 12:
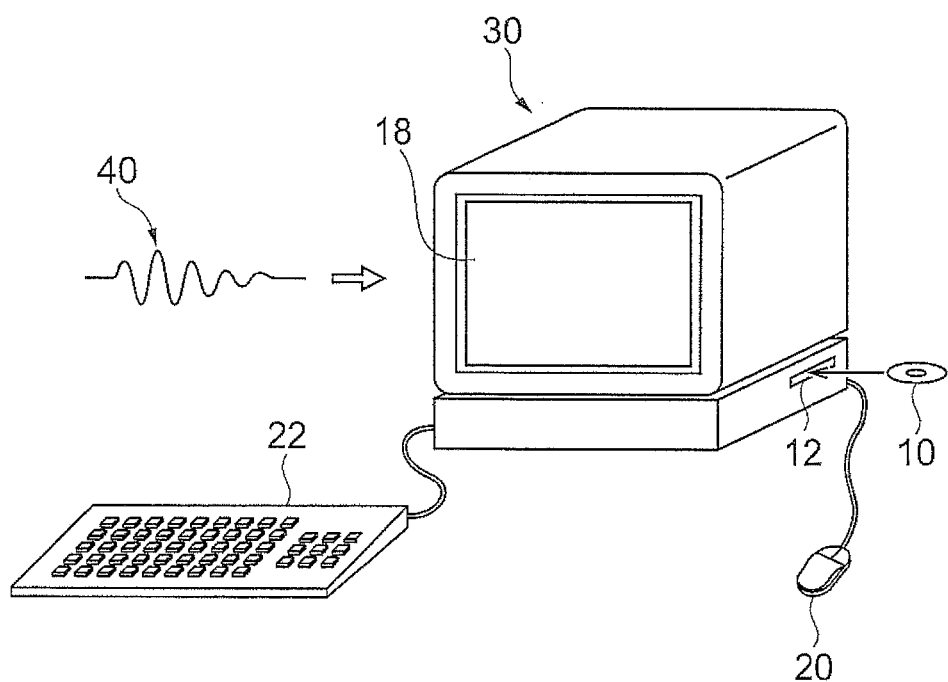
FIG. 12 is a perspective view of the computer of FIG. 11.

FIG. 11 is a hardware configuration diagram of an example computer for executing a program recorded in a recording medium and/or stored in memory, and FIG. 12 is a perspective view of the example computer for executing the program stored in the recording medium or memory. As the computer, a DVD player, a set top box, a cellular phone, and the like, which are provided with a CPU and perform information processes or control by software, are included.

As illustrated in FIG. 11, the computer 30 may be provided with a reading device 12, such as a flexible disk drive device, a CD-ROM drive device, a DVD drive device, and the like, a working memory (RAM) 14 in which an operating system resides, a memory 16 in which at least a part of a program stored in the recording medium 10 may be stored, a display 18, a mouse 20 and a keyboard 22 that are input devices, a communication device 24 for performing transmission/reception of data or the like, and a CPU 26, or processor, controlling the execution of the programs and instructions. In other examples, the computer may include fewer or greater numbers of components. In one example, if the recording medium 10 is inserted into the reading device 12, the computer 30 can access to the picture prediction encoding program and the picture prediction decoding program, which are stored in the recording medium 10, through the reading device 12, and can function as the picture prediction encoding device and the picture prediction decoding device by the corresponding picture prediction encoding program and picture prediction decoding program. In other examples, instructions regarding the image encoding/decoding system may be stored in any other one or more memories, the recording medium and/or the memory 16.

As illustrated in the example of FIG. 12, the picture prediction encoding program or the picture prediction decoding program may be provided through a network as a computer data signal 40 carried on a carrier. In this case, the computer 30 can store at least a portion of the picture prediction encoding program or the picture prediction decoding program, which are received through the communication device 24, in the memory 16, and execute the corresponding picture prediction encoding program and picture prediction decoding program.

Figure 14:
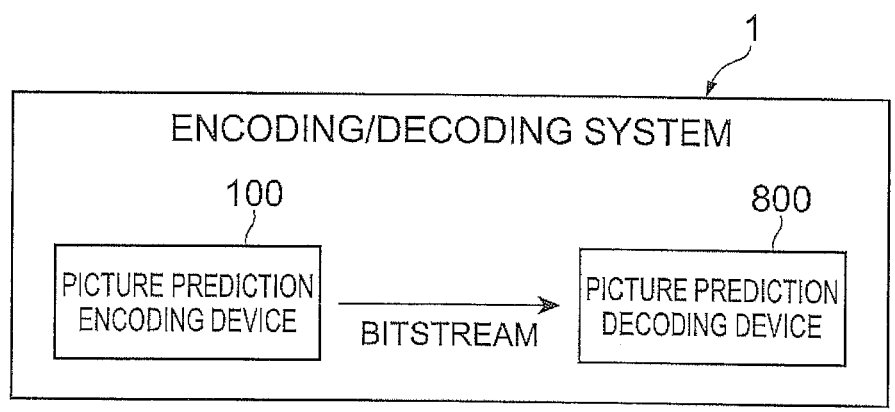
FIG. 14 is a diagram illustrating an example configuration of an encoding/decoding system.

In this case, the image encoding/decoding system may include at least a portion of the functionality of the above-described picture prediction encoding device 100 (see FIG. 1) and the above-described picture prediction decoding device 800 (see FIG. 8). As illustrated in the example of FIG. 14, the encoding/decoding system 1 may be configured to include the picture prediction encoding device 100 and the picture prediction decoding device 800. However, the picture prediction encoding device 100 and the picture prediction decoding device 800 can be connected by certain communication means, and bitstreams are transmitted from the picture prediction encoding device 100 to the picture prediction decoding device 800.

Also, the image encoding/decoding system may include an encoding/decoding method that is executed by the encoding/decoding system. For example, the encoding/decoding method includes: steps of the above-described picture prediction encoding method as illustrated in FIG. 2, which is executed by the picture prediction encoding device 100; and steps of the above-described picture prediction decoding method as illustrated in FIG. 9, which is executed by the picture prediction decoding device 800. Also, as an aspect in the case where a plurality of division shapes are present, the encoding/decoding method includes: steps of the above-described picture prediction encoding method as illustrated in FIG. 5, which is executed by the picture prediction encoding device 100; and steps of the above-described picture prediction decoding method as illustrated in FIG. 10, which is executed by the picture prediction decoding device 800.

As described above, in the case of generating the intra prediction signal by the extrapolating method, the prediction accuracy of pixels which are far apart from the boundary of the subject block is prevented from being degraded, and thus a picture signal having a complicated design can be efficiently predicted.

REFERENCE SIGNS LIST

1: encoding/decoding system; 100: picture prediction encoding device; 101: input terminal; 102: block divider; 103: prediction signal generator; 104: frame memory; 105: subtractor; 106: transformer; 107: quantizer; 108: de-quantizer; 109: inverse-transformer; 110: adder; 111: entropy encoder; 112: output terminal; 800: picture prediction decoding device; 801: input terminal; 802: data analyzer; 803: de-quantizer; 804: inverse-transformer; 805: adder; 806: output terminal; 807: frame memory; 808: prediction signal generator; 10: recording medium; 12: reading device; 14: working memory; 16: memory; 18: display; 20: mouse; 22: keyboard; 24: communication device; 30: computer; and 40: computer data signal.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A picture prediction decoding device comprising:
an input unit configured to divide a picture into a plurality of blocks, the input unit further configured to divide a block included in the plurality of blocks into a plurality of small regions, wherein a small region included among the small regions is other than square and a length of a first side of the small region is longer than a length of a second side of the small region that is different from the first side, the input unit further configured to input compressed picture data that includes a residual signal generated by prediction-encoding a pixel signal included in the small region, and prediction signal generation related information indicating a method of generating a prediction signal of the small region in the prediction-encoding;
a decompression unit configured to extract and decompress the residual signal of the small region from the compressed picture data to generate a reproduced residual signal;

a prediction signal generation unit configured to extract the prediction signal generation related information from the compressed picture data, and generate the prediction signal of the small region based on the prediction signal generation related information;

a picture decompression unit configured to decompress the pixel signal of the small region by addition of the reproduced residual signal to the prediction signal of the small region; and a storage unit configured to store the decompressed pixel signal as a reproduced pixel signal, wherein the prediction signal generation unit is further configured to generate the prediction signal of the small region using an already reproduced pixel signal that is in contact with the first side, and is not in contact with the second side.

2. The picture prediction decoding device according to claim 1, wherein the prediction signal generation unit is further configured to specify a shape of the small region based on the prediction signal generation related information, and generate the prediction signal of the small region according to the specified shape of the small region based on the prediction signal generation related information.

3. The picture prediction decoding device according to claim 1, wherein the decompression unit is configured to decompress the residual signal of the small region to generate the reproduced residual signal by specification of a shape of the small region based on the prediction signal generation related information, and the decompression unit is further configured to perform de-quantization and inverse frequency transform according to the specified shape of the small region.

4. A picture prediction decoding method that is executed by a picture prediction decoding device, comprising steps of:

dividing a picture into a plurality of blocks with a processor, and further dividing a block included among the blocks with the processor into a plurality of small regions, wherein a region included among the small regions is other than square, and a length of a first side of the small region is longer than a length of a second side of the small region, the second side being different from the first side;

inputting compressed picture data with the processor that includes a residual signal generated by prediction-encoding a pixel signal included in the small region and prediction signal generation related information indicating a method of generating a prediction signal of the small region in the prediction encoding;

the processor extracting and decompressing the residual signal of the small region from the compressed picture data to generate a reproduced residual signal;

the processor extracting the prediction signal generation related information from the compressed picture data and generating the prediction signal of the small region based on the prediction signal generation related information;

the processor decompressing the pixel signal of the small region by adding the reproduced residual signal to the prediction signal of the small region; and storing the decompressed pixel signal as a reproduced pixel signal, wherein, in the step of generating the prediction signal of the small region, the prediction signal of the small region is generated using an already reproduced pixel signal that is in contact with the first side and is not in contact with the second side.

5. The picture prediction decoding method according to claim 4, wherein, in the step of generating the prediction signal of the small region, a shape of the small region is specified based on the prediction signal generation related information, and the prediction signal of the small region is generated according to the specified shape of the small region based on the prediction signal generation related information.

6. The picture prediction decoding method according to claim 4, wherein, the step of decompressing the pixel signal further comprises decompressing the residual signal of the small region to generate the reproduced residual signal by specifying a shape of the small region based on the prediction signal generation related information, and performing de-quantization and inverse frequency transformation according to the specified shape of the small region.

7. A non-transitory computer readable storage medium for an image encoding/decoding system, the computer readable storage medium comprising instructions executed by a computer for picture prediction decoding, the instructions comprising:

an input unit executable to divide a picture into a plurality of blocks, the input unit further executable to divide a block included among the blocks into a plurality of small regions, wherein a small region included among the small regions is non-square, and a length of a first side of the small region is longer than a length of a second side of the small region, the second side being different from the first side, the input unit further executable to input compressed picture data that includes prediction signal generation related information and a residual signal of the small region generated by prediction-encoding a pixel signal included in the small region, the prediction signal generation related information indicating a method of generating a prediction signal of the small region during prediction-encoding;

a decompression unit executable to extract and decompress the residual signal of the small region from the compressed picture data to generate a reproduced residual signal;

a prediction signal generation unit executable to extract the prediction signal generation related information from the compressed picture data, and generate the prediction signal of the small region based on the prediction signal generation related information;

a picture decompression unit executable to decompress the pixel signal by addition of the reproduced residual signal to the prediction signal of the small region; and a storage unit executable to store the decompressed pixel signal as a reproduced pixel signal, wherein the prediction signal generation unit is further executable to generate the prediction signal of the small region using an already reproduced pixel signal that is in contact with the first side, and is not in contact with the second side.

* * * * *